United States Patent [19]

Chiussi et al.

[11] Patent Number: 6,075,791
[45] Date of Patent: Jun. 13, 2000

[54] SYSTEM FOR GUARANTEEING DATA TRANSFER RATES AND DELAYS IN PACKET NETWORKS

[75] Inventors: Fabio Massimo Chiussi, Tinton Falls; Andrea Francini, Matawan, both of N.J.

[73] Assignee: Lucent Technologies Inc., Murray Hill, N.J.

[21] Appl. No.: 08/959,362

[22] Filed: Oct. 28, 1997

[51] Int. Cl.$^7$ ............................... H04L 12/28; H04J 3/16
[52] U.S. Cl. ............................................ 370/412; 370/468
[58] Field of Search .................................. 370/412, 413, 370/419, 428, 429, 448, 355, 358, 359, 461, 462, 465, 468, 231, 232, 235, 389, 395, 411; 340/825.5, 825.51, 825.52

[56] References Cited

U.S. PATENT DOCUMENTS

| 5,224,099 | 6/1993 | Corbalis et al. ........................ 370/94.2 |
| 5,313,454 | 5/1994 | Bustini et al. ........................... 370/231 |
| 5,414,704 | 5/1995 | Spinney .................................... 370/389 |
| 5,633,859 | 5/1997 | Jain et al. ................................. 370/234 |
| 5,844,890 | 12/1998 | Delp et al. ............................... 370/230 |
| 5,926,459 | 7/1999 | Lyles et al. .............................. 370/412 |

OTHER PUBLICATIONS

"Rate–Proportional Servers: A Design Methodology for Fair Queueing Algorithms," D. Stiliadis et al., Technical Report #UCSC–CLR–95–58, Dec. 1995, Baskin Center for Computer Engineering & Information Sciences, University of California, Santa Cruz, CA.

"Efficient Fair Queueng Algorithms for ATM and Packet Networks," D. Stiliadis et al., Technical Report #UCSC–CRL–95–59, Dec. 1995, Baskin Center for Computer Engineering & Information Sciences, University of California, Santa Cruz, CA.

"Hierarchical Packet Fair Queueing Algorithms," J.C.R. Bennett et al., Computer Communications Review Conf., ACM SIGCOMM '96, Aug. 26–30, 1996, vol. 26, No. 4, p. 143–156.

"Fair Queueing Algorithms for Packet Scheduling in BISDN," S. J. Golestani, IZS '96 Proceedings of Digital Communications, Zurich Switzerland, Feb. 21–23, 1996, p. 39–51.

"Carry–Over Round Robin: A Simple Cell Scheduling Mechanism for ATM Networks," D. Saha, et al., Proceedings IEEE INFOCOM '96 on Computer Communications, Mar. 24–28, 1996, vol. 2, p. 630–637.

*Primary Examiner*—Chau Nguyen
*Assistant Examiner*—Chiho Andrew Lee
*Attorney, Agent, or Firm*—F. B. Luludis

[57] ABSTRACT

A system is disclosed which services a plurality of queues associated with respective data connections such that the system guarantees data transfer rates and data transfer delays to the data connections. This is achieved by associating each connection having at least one data packet waiting in its associated queue (such a connection called a backlogged connection) with a timestamp generated as a function of system parameters including (a) the number of queues that are backlogged, (b) the data transfer rate guaranteed to each connection, (c) the sum of data transfer rates guaranteed to all backlogged connections, (d) the previous timestamp of the connection, and (e) the weighted sum of the timestamps of all backlogged connections, each timestamp weighted by the data transfer rate guaranteed to the corresponding connection. The backlogged connection associated with the timestamp having the smallest value among all of the backlogged connections is then identified and a data packet is transmitted from the queue corresponding to that connection. A new timestamp is then generated for that connection if it is still backlogged. Once the transmission of the data packet is completed, the foregoing determination of the connection with the minimum timestamp is then repeated to identify the next queue to be serviced.

32 Claims, 14 Drawing Sheets

FIG.6

| FIG.5A |
|---|
| FIG.5B |
| FIG.5C |

FIG. 10

| FIG.9A |
|--------|
| FIG.9B |
| FIG.9C |

SYSTEM FOR GUARANTEEING DATA TRANSFER RATES AND DELAYS IN PACKET NETWORKS

FIELD OF THE INVENTION

The present invention relates to a system for scheduling packets in packet networks and more particularly relates to guaranteeing data transfer rates to data sources and data transfer delays from data sources to destinations.

BACKGROUND OF THE INVENTION

The provision of negotiated Quality-of-Service (QoS) guarantees such as data transfer rate and data transfer delay to traffic generated by applications of widely different characteristics is a primary objective in packet networks. In such networks, when network resources such as communication links are shared among a plurality of network connections, sophisticated packet scheduling disciplines are necessary to satisfy the QoS requirements of delay-sensitive network connections. A server in a communication system providing such QoS guarantees typically employs multiple queues, in which each queue is associated with a corresponding network connection, and uses a scheduling algorithm to control the order in which the individual queues are served.

One such sophisticated scheduling algorithm is the Generalized Processor Sharing (GPS) scheduling policy. GPS is an idealized scheme which guarantees a negotiated minimum data transfer rate to each network connection, regardless of the behavior of other connections. GPS also guarantees a negotiated maximum end-to-end data transfer delay to each connection, and ensures that all connections are served in a fair manner. During any time interval, a GPS server serves all backlogged queues, i.e., queues which have packets waiting to be transmitted, simultaneously, each with an instantaneous service rate that is a function of the negotiated data transfer rate and delay associated with the respective connection. It can be appreciated that, because all connections have to be serviced simultaneously, the GPS algorithm cannot be implemented in a real packet network, and, therefore. is considered to be an ideal scheduling discipline.

A class of scheduling disciplines, called GPS-related packet-scheduling disciplines, which approximate the GPS scheduling policy to a certain degree, may be implemented in a real packet network. These algorithms are all based on maintaining a global function, referred to as virtual time or as system potential, which is a measure of the amount of service that has been provided by a server. A server uses this global function to compute a finishing virtual time, also referred to as timestamp, for each packet in the associated system; in which the timestamp is indicative of when the service of the corresponding packet should be completed. The server serves the packets based on the values of their respective timestamps, starting with the smallest value. The GPS-related packet-scheduling disciplines differ from one another in the specific function used as virtual time. Similarly to GPS, all the GPS-related packet-scheduling disciplines provide a negotiated minimum data transfer rate to each network connection. The specific virtual-time function that is used by each such discipline determines the implementation complexity of the algorithm, the value of the maximum data transfer delay that the algorithm can provide to a connection, and whether or not the algorithm serves all connections in a fair manner. An algorithm that is of minimum complexity, provides a small value of the maximum data transfer delay to each connection, and serves all connections fairly, is highly desirable.

One example of a GPS-related packet-scheduling discipline is the so called Packet-by-packet GPS (P-GPS) algorithm. P-GPS guarantees maximum data transfer delays very close to those of GPS, and serves the connections almost as fairly as GPS. P-GPS uses a system-potential function that is directly derived from a background simulation of GPS. However, P-GPS is not practical in high-speed packet networks, since the task of simulating GPS is very complex. Another example of a GPS-related packet-scheduling discipline is a so called Self-Clocked Fair Queueing (SCFQ) algorithm. SCFQ has minimum implementation complexity, which makes it practical for implementation in high-speed packet networks. It also serves the connections almost as fairly as GPS. However, SCFQ guarantees maximum data transfer delays that are much larger than those that are guaranteed by GPS and P-GPS. Another example of a GPS-related packet-scheduling discipline is a so called Virtual Clock algorithm. The Virtual Clock algorithm has a minimum implementation complexity; and it also guarantees maximum data transfer delays very close to those of GPS and P-GPS. However, it does not always serve all connections in a fair manner. Still another example of a GPS-related packet-scheduling discipline is a Starting-Potential Fair Queueing (SPFQ) algorithm. The SPFQ algorithm guarantees maximum data transfer delays very close to those of GPS and P-GPS, and serves the connections almost as fairly as GPS and P-GPS. However, the implementation complexity of the SPFQ algorithm is considerably higher than either of the SCFQ and Virtual Clock algorithms.

Other GPS-related packet-scheduling disciplines, in addition to the four examples listed above, are known in the relevant art. However, none of these GPS-related packet-scheduling disciplines has all of the qualities that are desirable in a packet scheduler, i.e., a packet scheduler which has minimum complexity, provides a small value of the maximum data transfer delay to each connection, and serves all connections fairly.

SUMMARY OF THE INVENTION

It is an object of the present invention to provide a GPS-related packet-scheduling discipline of minimum complexity, which guarantees a small value of the maximum data transfer delay to each connection, and serves all connections fairly.

In accordance with a first aspect of the invention, which pertains to the case in which all packets arriving at the scheduling system have equal length, the scheduling of the packets is performed by generating a timestamp for the packet at the head of each of the queues associated with respective connections that have packets awaiting in the scheduling system to be scheduled for transmission (such connections are referred herein to as backlogged connections), and by selecting for transmission the packet whose timestamp has the minimum value among the timestamps for all packets that are at the head of. all the queues associated with backlogged connections. The timestamp for each packet associated with a connection i is generated at the time when the packet reaches the head of the queue corresponding to connection i, and is done as a function of (a) the system potential at that time, (b) the value of the timestamp of the previous packet of connection i, and (c) the data transfer rate allocated to connection i. The system potential is determined as a function of (a) the number of all connections that are backlogged in the scheduling system at that time, (b) the sum of the rates of all the connections that are backlogged in the scheduling system at that time, and (c) the weighted average of the timestamps of the packets that are waiting for transmission at the head of the queues of all backlogged connections in the scheduling system at that time, the weight of each timestamp being a function of the data transfer rate allocated to the corresponding connection.

In accordance with another aspect of the invention, which pertains to the case in which the packets arriving at the scheduling system have different lengths, the scheduling of the packets is performed by generating a timestamp for the packet at the head of each of the queues associated with backlogged connections, and by selecting for transmission the packet whose timestamp has the minimum value among the timestamps for all packets that are at the head of all the queues associated with backlogged connections. The timestamp for each packet of a connection i is generated at the time when the packet reaches the head of the queue corresponding to connection i, and is done as a function of (a) the system potential at that time, (b) the value of the timestamp of the previous packet of connection i, (c) the length of the packet, and (d) the data transfer rate allocated to connection i. The system potential in this case is determined as a function of (a) the timestamps of the packets that are waiting for transmission at the head of the queues of all the connections that are backlogged in the scheduling system at that time, (b) the sum of the rates of all the connections that are backlogged in the scheduling system at that time, (c) the sum of length of all the packets that are waiting for transmission at the head of the queues of all the connections that are backlogged in the scheduling system at that time, and (d) the weighted average of the timestamps of the packets that are waiting for transmission at the head of the queues of all backlogged connections in the scheduling system at that time, the weight of each timestamp being a function of the data transfer rate allocated to the corresponding connection.

These and other aspects and features of the claimed invention will become apparent in the ensuing detailed description taken in conjunction with the accompanying drawings, which disclose a number of preferred embodiments of the invention.

BRIEF DESCRIPTION OF THE DRAWINGS

The invention is described in relation to the accompanying drawings in which like reference numerals refer to like elements and wherein:

FIG. 6 illustrates the way in which FIGS. 5A–5C should be arranged with respect to one another.

FIG. 10 illustrates the way in which FIGS. 9A–9C should be arranged with respect to one another.

DETAILED DESCRIPTION OF PREFERRED EMBODIMENTS

Figure 1:
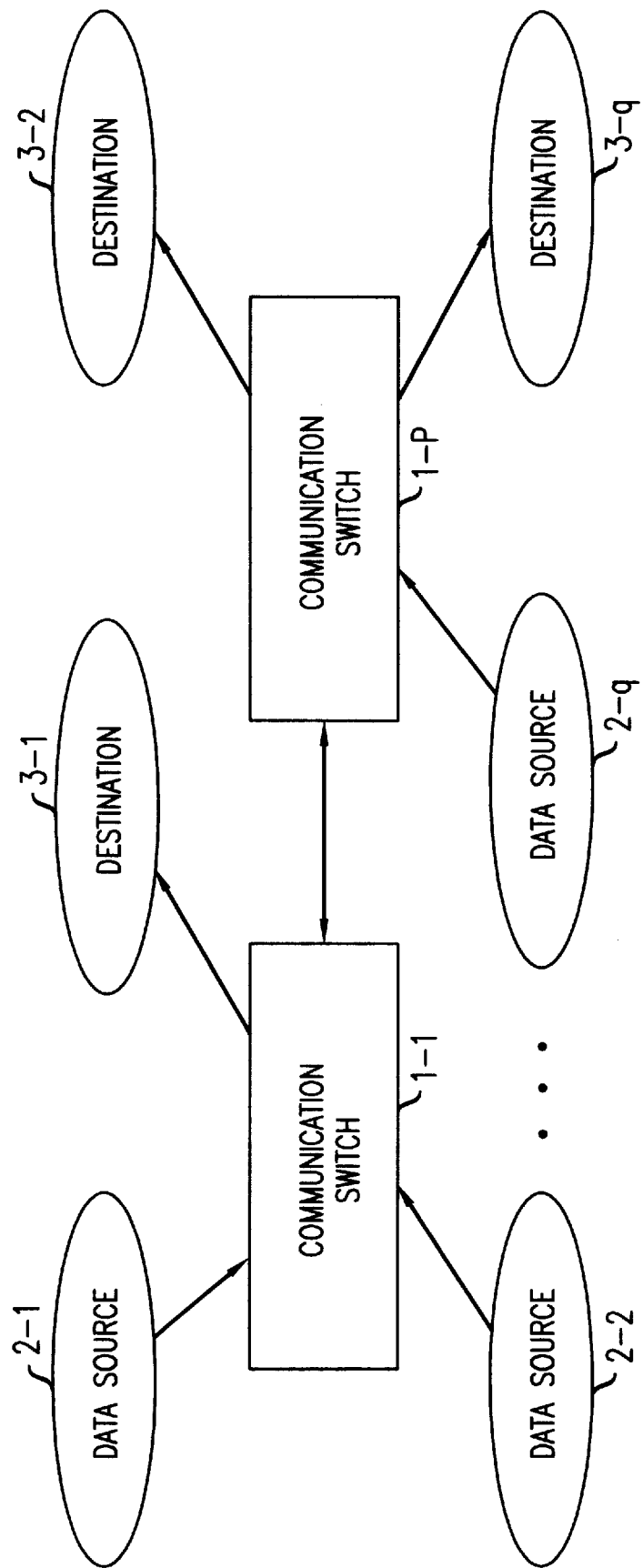
FIG. 1 illustrates a packet network in which a number of switches, data sources and destinations are connected.

FIG. 1 shows a packet network in which a plurality of switches 1-1 through 1-p are connected to each other by communication links. A number of data sources 2-1 through 2-q are connected to the communication switches. A network connection is established from each of the data sources to a corresponding destination 3-1 through 3-q, and data packets are transmitted from each data source to the corresponding destination.

Figure 2:
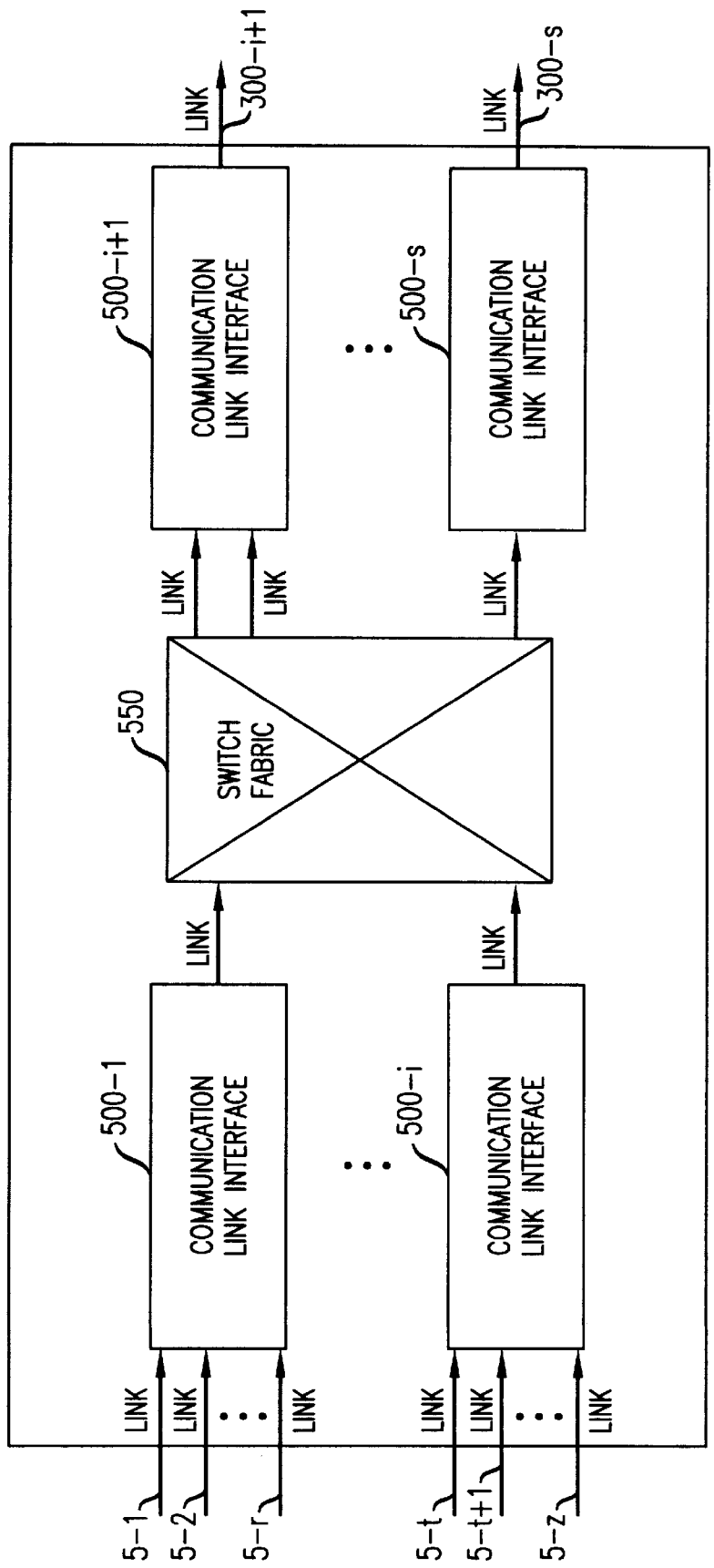
FIG. 2 illustrates a communication switch in the packet network of FIG. 1.

FIG. 2 shows a communication switch in such packet network, e.g., switch 1-1. The communication switch includes, inter alia, a plurality of communication link interfaces 500-1 through 500-s. Each of said communication link interfaces connects a plurality of input links to an output link; the communication link interface receives the data packets associated with corresponding network connections from the input links and transmits them to the output link. As shown in FIG. 2, the communication switch may contain just one or a plurality of such communication link interfaces 500. For example, such a communication link interface 500 may be in front of the switch fabric 550, in which case the input links of the communication link interface may be a plurality of input links of the communication switch, and the output link of the communication link interface connects to the switch fabric 550, or such a communication link interface 500 may be at the output of the switch fabric 550, in which case the input links of the communication link interface may be a plurality of output links of the switch fabric 550, and the output link of the communication link interface may be one of the output links of the communication switch.

Figure 3:
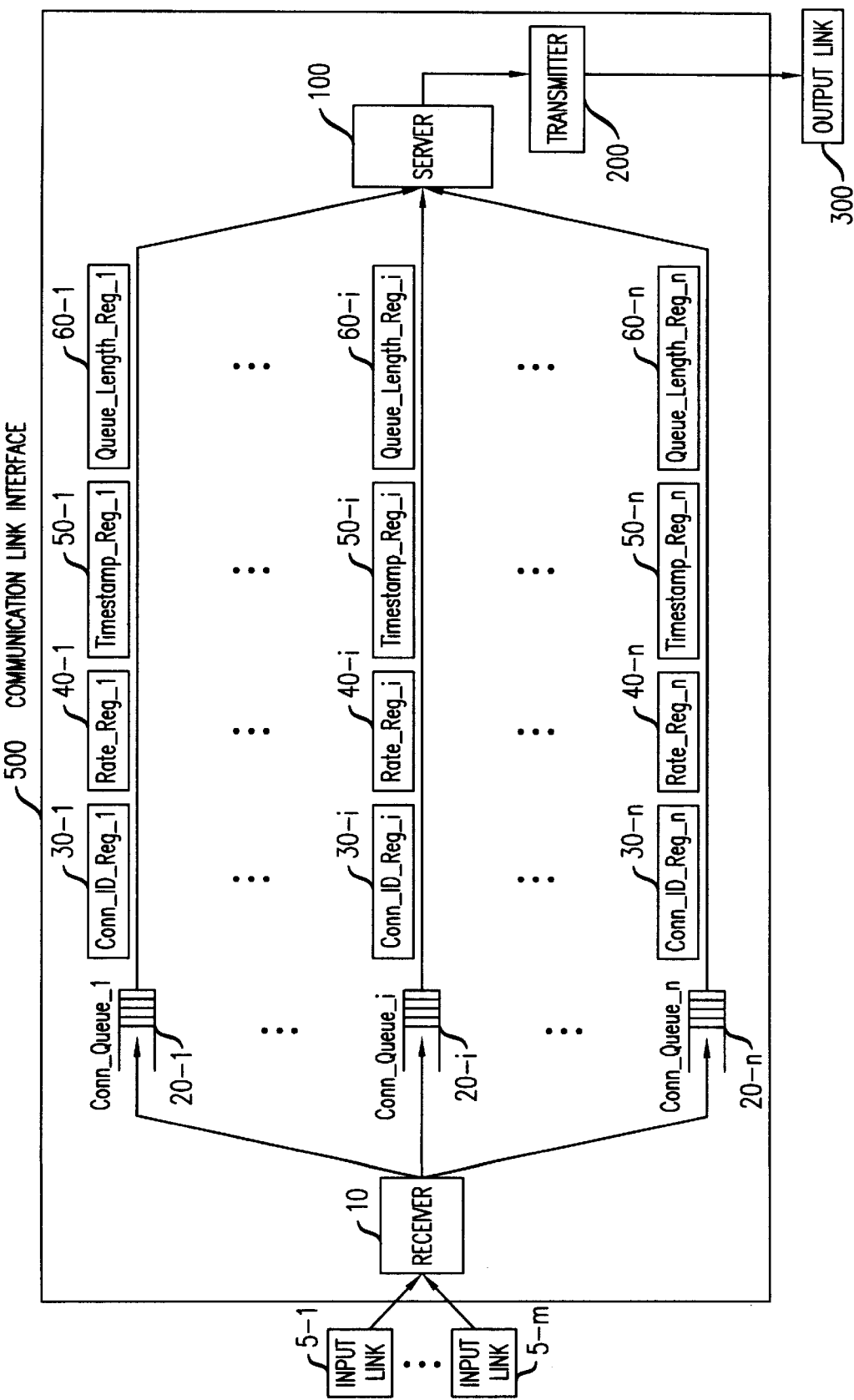
FIG. 3 is a block diagram of a communication link interface according to a first embodiment of the present invention for scheduling the transmission of data packets in a communication link.

FIG. 3 shows a block diagram of an apparatus or communication link interface 500 according to a first illustrative embodiment of the present invention.

The communication link interface 500 includes a data packet receiver 10 which receives the data packets arriving from input links 5-1 through 5-m. Receiver 10 uses the contents of a connection identifier field contained in the header of each packet (not shown) to identify its respective connection i. In this embodiment, all packets that the receiver 10 receives have the same length. For example, this is the case when the switch that contains the communication link interface is connected to an Asynchronous Transfer Mode (ATM) network. For each packet, the receiver 10 also determines, at the time of receiving a packet, whether or not the packet can be queued in a connection queue 20-i corresponding to the identified connection i, as will be described below. If the packet can be queued, then the receiver 10 stores the packet in the appropriate connection queue 20-i. Server 100 (described below), in response to that action, increments the queue length register 60-i associated with the identified queue; otherwise, if receiver 10 determines that the packet cannot be queued, the packet is discarded.

For each connection i of a plurality of switched connections 1 through n, the communication link interface 500 includes (a) a connection queue 20-i, which may be, for example, a so-called First-In-First-Out (FIFO) queue used to store the received data packets of connection i, (b) a connection identifier register 30-i, used to store the local identifier identifying connection i, (c) a rate register 40-i, used to store the value of data transfer rate reserved to connection i, (d) a timestamp register 50-i, used to store the timestamp of connection i, and (e) a queue length register 60-i, used to store the number of data packets of connection i that are currently in the communication link interface 500 (including the transmitter 200). When a packet associated with connection i is being transmitted by transmitter 200, the timestamp of connection i is the timestamp of that packet. Also, when connection queue 20-i is not empty and the transmitter 200 is not transmitting a packet associated with connection i, the timestamp of connection i is the timestamp of the packet at the head of connection queue 20-i. Further, when connection queue 20-i is empty and the transmitter 200 is not transmitting a packet associated with connection i, the timestamp of connection i is the timestamp of the last transmitted packet of connection i.

Server 100 generates a new timestamp for connection i every time a new packet reaches the head of the associated connection queue 20-i, and stores the value of the newly-generated timestamp in timestamp register 50-i. Every time the transmitter 200 becomes available for transmission of a next packet, Server 100 selects a data packet among all the packets waiting at the head of the queues associated with all the connections that are backlogged at the time of such availability, and sends the selected packet to the transmitter 200. The assignment of a new timestamp to a connection i is based on the following rules, which depend on whether or not the connection i was backlogged before the new packet arrived at the head of connection queue 20-i.

If connection i was not backlogged before the packet arrived at the head of connection queue 20-i, meaning that connection i becomes backlogged because of the arrival of the new packet, then the new timestamp of connection i is generated according to the following expression:

$$F_i^k = \max(F_i^{k-1}, P(a_i^k)) + \frac{1}{r_i} \quad (1)$$

where $F_i^k$ is the timestamp assigned to the k-th data packet of connection i ($F_i^0 = 0$), $a_i^k$ is the time of arrival of the k-th data packet of connection i at the head of connection queue 20-i, $P(a_i^k)$ is the value of the system potential at time $a_i^k$ and is maintained by Server 100, and $r_i$ is the data transfer rate allocated to connection i, normalized to the rate of Server 100.

If connection i was backlogged before the packet arrived at the head of connection queue 20-i, meaning that the new packet has arrived at the head of connection queue 20-i as a result of transmitter 200 having just transmitted another packet of connection i, then the new timestamp of connection i is assigned according to the following equation:

$$F_i^k = F_i^{k-1} + \frac{1}{r_i} \quad (2)$$

where $F_i^{k-1}$ is the timestamp assigned to the (k−1)-th data packet of connection i.

At the end of the transmission of the j-th packet in the system, the system-potential function P appearing in equation (1) and maintained by server 100 is computed according to the following equation:

$$P(j) = \max\left(P(j-1)+1, \frac{\overline{F}_{B(j)} - n_{B(j)}}{r_{B(j)}}\right) \quad (3)$$

where:

$B(j)$ is the set of all the backlogged connections at that time, which are all the connections i whose corresponding queue length register 60-i contains a number greater than 0 at the end of transmission of the j-th packet in the system.

$$\overline{F}_{B(j)} = \sum_{i \in B(j)} F_i \cdot r_i$$

is the weighted sum of the timestamp values $F_i$ that are stored in the timestamp registers 50-i of all the backlogged connections i∈B(j) at the end of the transmission of the j-th packet in the system. In the weighted sum, the weight of each timestamp value $F_i$ is the reserved data transfer rate $r_i$ of the corresponding connection i; the value of $r_i$ is stored in rate register 40-i.

$n_{B(j)}$ is the number of all the connections i∈B(j) that are backlogged at the end of the transmission of the j-th packet in the system.

$r_{B(j)} = \Sigma_{i \in B(j)} r_i$ is the sum of the values that are stored in the rate registers 40-i, computed over all the backlogged connections i∈B(j).

Server 100 determines the system-potential function each time a transmission is completed. Whenever server 100 becomes idle as a result of all connection queues 20-1 through 20-n being empty, then server 100 resets to 0 the system potential P and the content of each timestamp register 50-i.

Whenever transmitter 200 is available for the transmission of a new/next data packet, then server 100 selects the next connection i to be serviced. Connection i is selected for transmission if the content of queue length register 60-i is greater than 0, and the content of timestamp register 50-i has a value that is the minimum among the values contained in the timestamp registers 50-h associated with all backlogged connections h.

When a connection i is selected for transmission by Server 100, then the data packet at the head of the corresponding connection queue 20-i is unloaded from that queue and supplied to the transmitter 200.

When the transmitter 200 completes the transmission over the output link 300 of a packet belonging to connection i, Server 100 decrements the content of the queue length register 60-i. If the decremented value stored in queue length register 60-i is greater than 0, then Server 100 generates the new timestamp of connection i. Then Server 100 updates the system-potential function P according to equation (3) using (a) the value of the newly-generated timestamp of connection i, (b) the previous value of the timestamp of connection i stored in timestamp register 50-i, and (c) the value in rate register 40-i. Then, Server 100 removes the previous value in timestamp register 50-i, and stores the value of the newly-generated timestamp of connection i in the timestamp register 50-i. If the decremented value stored in queue length register 60-i is 0, then Server 100 updates the system-potential function P according to equation (3) using the content of timestamp register 50-i and the content of rate register 40-i.

Figure 4:
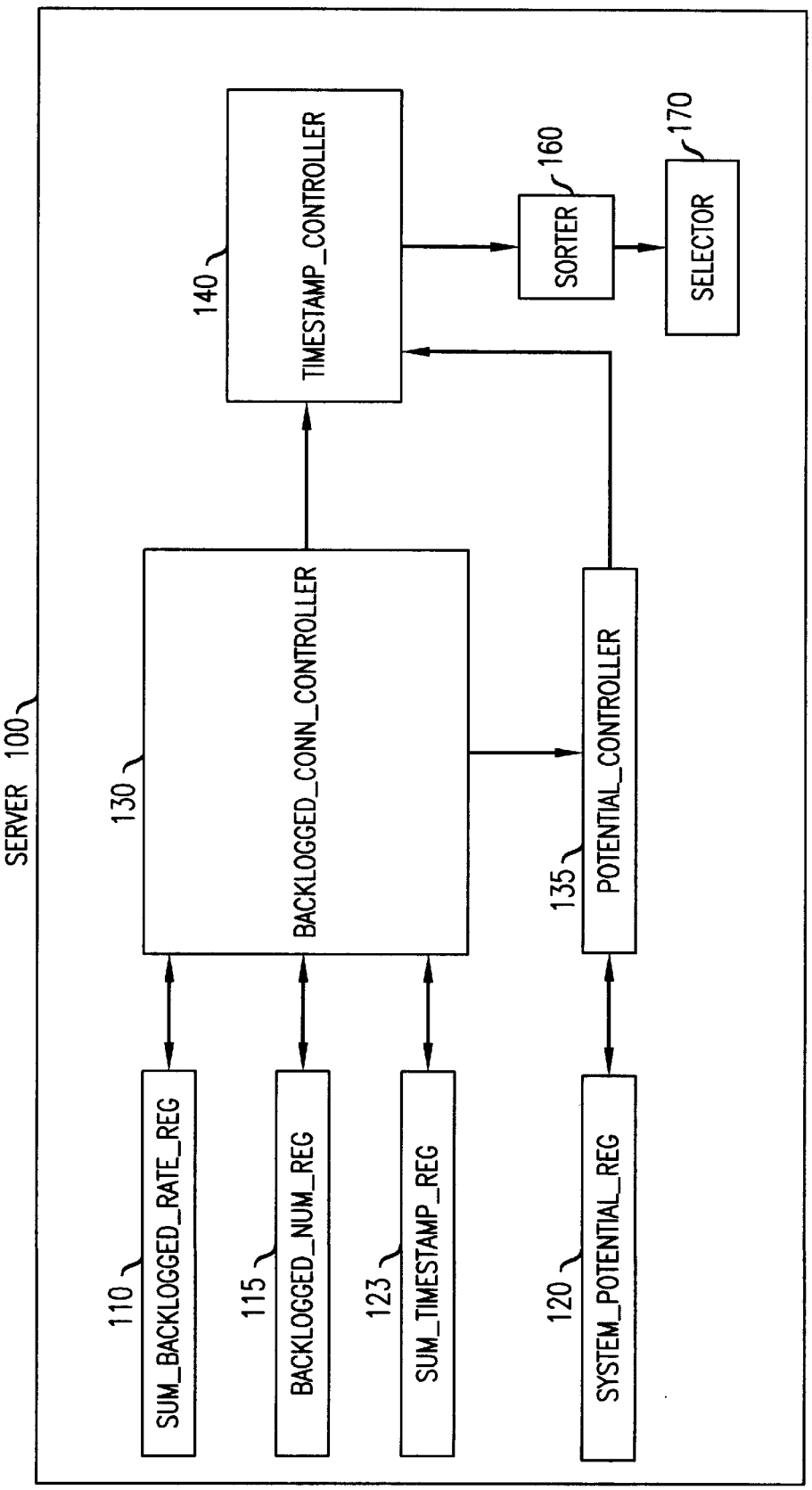
FIG. 4 is a block diagram of the server that is part of the communication link interface of FIG. 3.

FIG. 4 shows an apparatus or server 100 according to the first illustrative embodiment of the present invention.

The first embodiment of server 100 includes (a) a register 110, for storing the sum of the reserved data transfer rates of all backlogged connections (the content of register 110 is called $r_{B(j)}$ in equation (3) above); (b) a register 115, for storing the number of backlogged connections (the content of register 115 is called $n_{B(j)}$ in equation (3) above); (c) a register 120, for storing the current value of the system-potential function (the content of register 120 is called P in equation (1), equation (2), and equation (3) above); and (d) a register 123, for storing the weighted sum of the timestamps of all backlogged connections (the content of register 123 is called $\overline{F}_{B(j)}$ in equation (2)). Server 100 also includes (a) a controller 130, which (i) updates the content of registers 110, 115, and 123, (ii) supplies the content of registers 110, 115, and 123 to controller 135, and (iii) supplies to controller 140 the previous/old value of the timestamp stored in the timestamp register 50-i of the connection i for which a new timestamp must be computed; (b) a controller 135, which determines the value of the system potential according to equation (3) each time a transmission of a packet associated with connection i in the system is completed by transmitter 200, using the content of registers 110, 115, 120, 123, and 50-i, and the new value of the timestamp of connection i; and (c) a controller 140, which determines the timestamp to be assigned to connection i when a new packet arrives at the head of its connection queue 20-i, according to (i) equation (1) if connection i was not backlogged before the new packet arrived at the head of connection queue 20-i, and (ii) equation (2) if connection i was already backlogged before the new packet arrived at the head of the connection queue 20-i.

Server 100 further includes a sorter 160 and a selector 170. At any time the transmitter 200 becomes available for a new transmission of a data packet, the sorter 160 supplies the identifier of the backlogged connection i whose timestamp register 50-i contains the minimum value among all backlogged connections. The selector 170 removes from connection queue 20-i the packet that is at the head of connection queue 20-i corresponding to connection i, whose identifier has been supplied by the sorter 160, and supplies the packet to the transmitter 200.

Figure 5A:
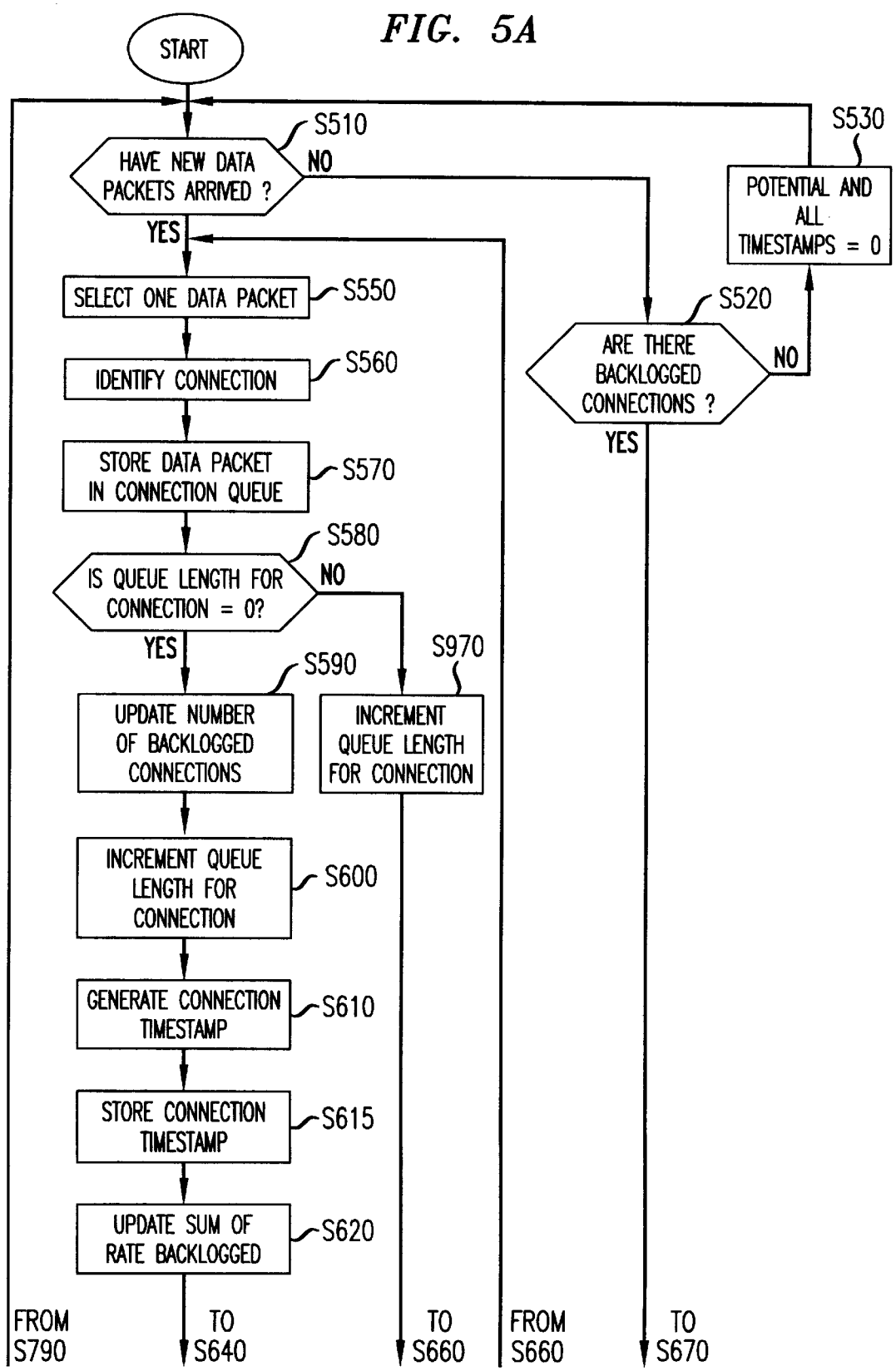
FIGS. 5A–5C illustrate in flowchart form a first method of scheduling the transmission of data packets in a communication link interface of FIG. 3 in accordance with the principles of the present invention.
Figure 5B:
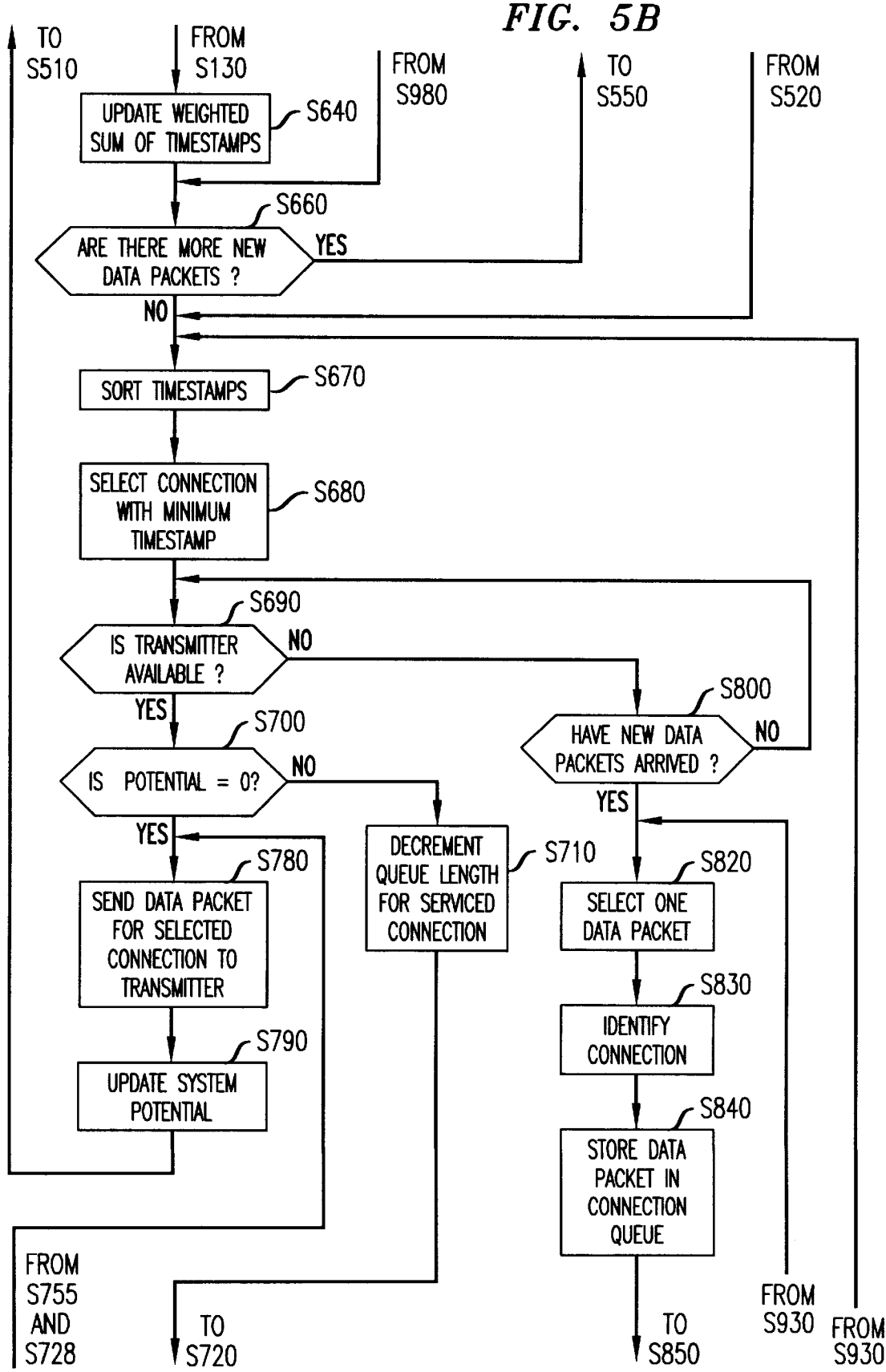
Figure 5C:
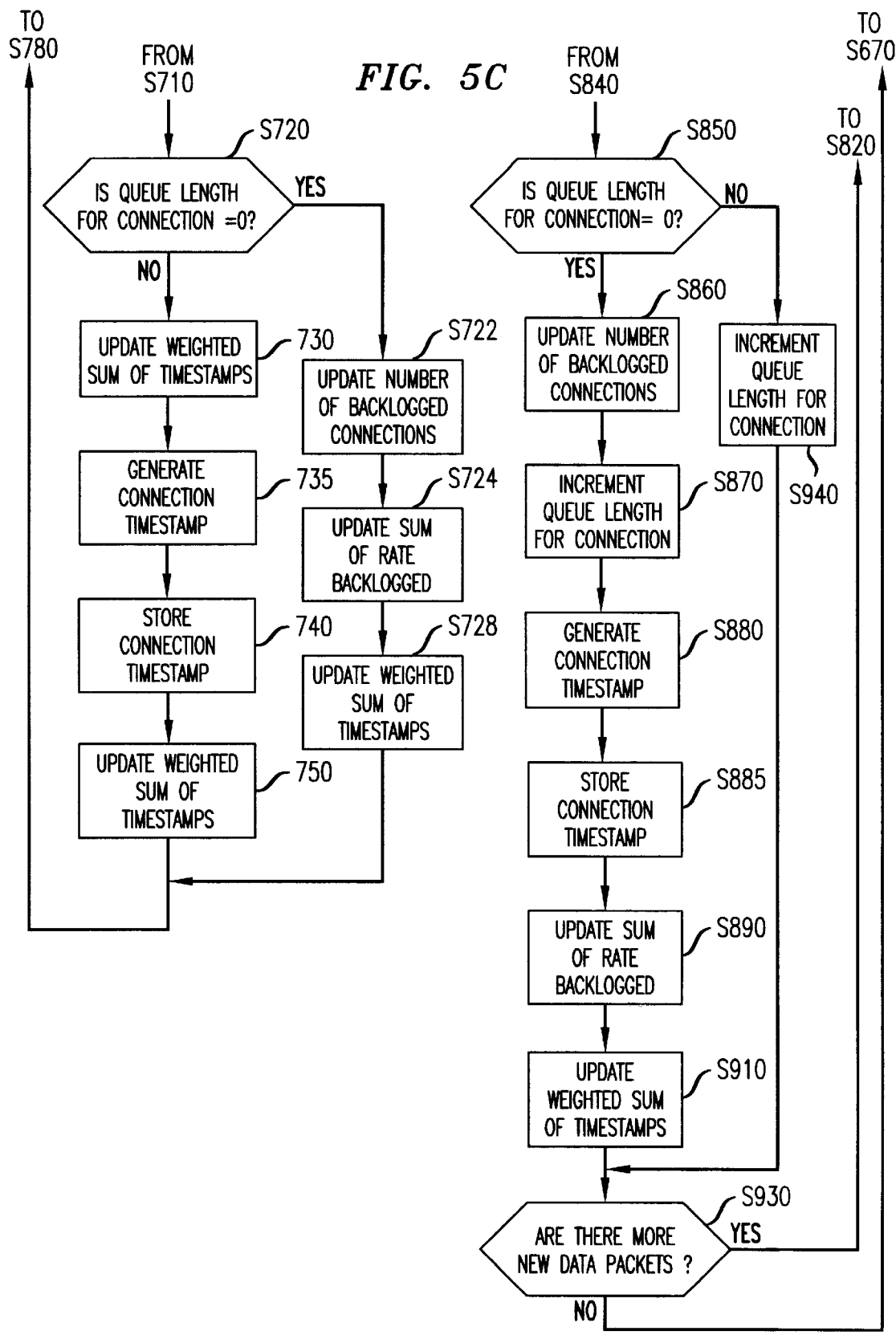

FIGS. 5A through 5C (which are arranged relative to one another as shown in FIG. 6) illustrate in flow chart form showing an illustrative embodiment of the operation of server 100 that implements a first method of scheduling the transmission of data packets of fixed size according to the present invention.

Referring to FIGS. 5A–5C, in step S510, if new data packets have arrived at the receiver 10, then server 100 proceeds to step S550. Otherwise, Server 100 proceeds to step S520.

In step S520, if no backlogged connections are available (which is indicated by the content of register 115 being equal to 0), server 100 then proceeds to step S530. Otherwise, Server 100 proceeds to step S670.

In step S530, Server 100 resets to 0 the content of register 120 (which stores the value of the system potential) and all of the registers 50-1 through 50-n. Server 100 then proceeds to step S510.

In step S550, Server 100 selects one of the data packets that have just arrived at the receiver 10. Server 100 then proceeds to step S560.

In step S560, Server 100 identifies the connection i corresponding to the packet selected in step S550. Server 100 identifies connection i through a connection identifier contained in the header of the received packet (not shown). The identification of connection i allows to identify connection queue 20-i corresponding to connection i, where the packet should be stored. Server 100 then proceeds to step S570.

In step S570, Server 100 stores the packet in connection queue 20-i and then proceeds to step S580.

In step S580, if the content of queue length register 60-i is 0 (connection i is not backlogged), Server 100 proceeds to step S590. Otherwise, Server 100 proceeds to step S970.

In step S590, server 100 (more specifically, the controller 130) increments the content of register 115 and then proceeds to step S600.

In step S600, server 100 increments the content of queue length register 60-i. Server 100 then proceeds to step S610.

In step S610, server 100 (more specifically, the controller 140) computes the new timestamp of connection i identified in step S560 according to equation (1). Server 100 then proceeds to step S615.

In step S615, server 100 stores the timestamp of connection i in timestamp register 50-i and then proceeds to step S620.

In step S620, server 100 (more specifically, the controller 130) adds the content of rate register 40-i to the content of register 110. Server 100 then proceeds to step S640.

In step S640, server 100 (more specifically, the controller 130) adds the product of the contents of timestamp register 50-i and rate register 40-i to the content of register 123. Server 100 then proceeds to step S660.

In step S660, if additional new data packets have been received at the receiver 10, then server 100 proceeds to step S550. Otherwise, server 100 proceeds to step S670.

In step S670, the sorter 160 identifies the minimum among the contents of all registers 50-j corresponding to backlogged connections j. Server 100 then proceeds to step S680.

In step S680, the selector 170 identifies the connection i corresponding to the minimum timestamp found in step S670. Server 100 then proceeds to step S690.

In step S690, if transmitter 200 is already transmitting a packet over output link 300 and is therefore not available to transmit an other packet, then server 100 proceeds to step S800. Otherwise, server 100 proceeds to step S700.

In step S700, if the content of register 120, which stores the value of the system potential, is equal to 0 server 100 proceeds to step S780. Otherwise, server 100 proceeds to step S710.

In step S710, server 100 decrements the queue length register 60-h for the connection h corresponding to the last packet being transmitted by transmitter 200, and then proceeds to step S720.

In step S720, if the content of queue length register 60-h of connection h corresponding to the last packet being transmitted by transmitter 200 is 0, then server 100 proceeds to step S722. Otherwise, server 100 proceeds to step S730.

In step S722, server 100 (more specifically, the controller 130) decrements the content of register 115. Server 100 then proceeds to step S724.

In step S724, server 100 (more specifically, the controller 130) subtracts from the content of register 110 the content of rate register 40-h of connection h corresponding to the last packet being transmitted by transmitter 200. Server 100 then proceeds to step S728.

In step S728, server 100 (more specifically, the controller 130) subtracts the product of the contents of timestamp register 50-h and rate register 40-h of connection h corresponding to the last packet being transmitted by transmitter 200 from the content of register 123. Server 100 then proceeds to step S780.

In step S730, server 100 (more specifically, the controller 130) subtracts the product of the contents of timestamp register 50-h and rate register 40-h of connection h corresponding to the last packet being transmitted by transmitter 200 from the content of register 123. Server 100 then proceeds to step S735.

In step S735, server 100 (more specifically, the controller 140) computes the new timestamp of connection h corresponding to the last packet being transmitted by transmitter 200 according to equation (2). Server 100 then proceeds to step S740.

In step S740, server 100 stores the value of the newly-generated timestamp of connection h corresponding to the last packet being transmitted by transmitter 200 in timestamp register 50-h, and then proceeds to step S750.

In step S750, server 100 (more specifically, the controller 130) adds the product of the contents of timestamp register 50-h and rate register 40-h of connection h corresponding to the last packet being transmitted by transmitter 200 to the content of register 123. Server 100 then proceeds to step S780.

In step S780, the packet at the head of connection queue 20-i corresponding to connection i identified in step S680 by server 100 (more specifically, by the selector 170) is sent to the transmitter 200. Server 100 then proceeds to step S790.

In step S790, server 100 (more specifically, the controller 135) computes the new value of the system potential according to equation (3), using the content of registers 110, 115, 120, and 123, and stores it in register 120. Server 100 then proceeds to step S510.

In step S800, if new data packets have arrived at the receiver 10, then server 100 proceeds to step S820. Otherwise, server 100 proceeds to step S690.

In step S820, Server 100 selects one of the data packets that have just arrived at the receiver 10. Server 100 then proceeds to step S830.

In step S830, Server 100 identifies the connection w corresponding to the packet selected in step S820. Server 100 identifies the connection w through a connection identifier contained in the header of the packet (not shown). The identification of connection w allows server 100 to identify the connection queue 20-w corresponding to connection w where the packet should be stored. Server 100 then proceeds to step S840.

In step S840, server 100 stores the packet selected in step S820 in connection queue 20-w and then proceeds to step S850.

In step S850, if the content of queue length register 60-w is 0 (connection w is not backlogged), Server 100 proceeds to step S860. Otherwise, server 100 proceeds to step S940.

In step S860, server 100 (more specifically, the controller 130) increments the content of register 115. Server 100 then proceeds to step S870.

In step S870, server 100 increments the content of queue length register 60-w, and then proceeds to step S880.

In step S880, server 100 (more specifically, the controller 140) computes the new timestamp of connection i identified in step S830 according to equation (1). Server 100 then proceeds to step S885.

In step S885, server 100 stores the timestamp of connection w in timestamp register 50-w, and 100 then proceeds to step S890.

In step S890, server 100 (more specifically, the controller 130) adds the content of rate register 40-w to the content of register 110. Server 100 then proceeds to step S910.

In step S910, server 100 (more specifically, the controller 130) adds the product of the contents of timestamp register 50-w and rate register 40-w to the content of register 123. Server 100 then proceeds to step S930.

In step S930, if additional new data packets are available, then server 100 proceeds to step S820. Otherwise, server 100 proceeds to step S670.

In step S940, server 100 increments the content of queue length register 60-w corresponding to connection w identified in step S830, and then proceeds to step S930.

In step S970, server 100 increments the content of queue length register 60-i corresponding to connection i identified in step S560, and then proceeds to step S660.

Figure 7:
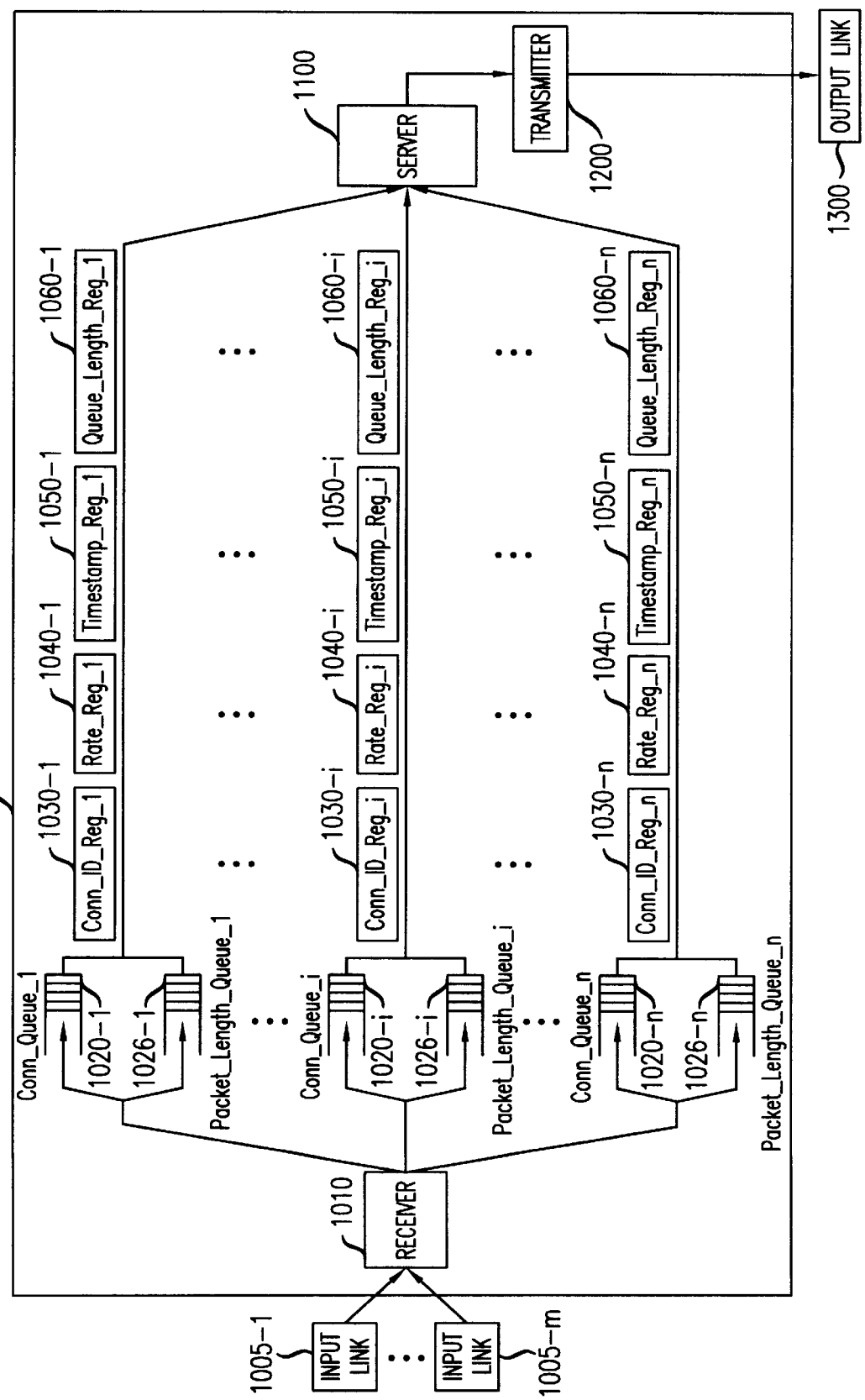
FIG. 7 is a block diagram of an apparatus of a communication link interface according to a second embodiment of the present invention for scheduling the transmission of data packets in a communication link.

FIG. 7 shows a block diagram of an apparatus or communication link interface 1500 according to a second embodiment of the present invention. Note that the following discussion of FIG. 7 is somewhat analogous to the discussion of FIG. 3.

The communication link interface 1500 includes a receiver 1010 which receives the data packets arriving from input links 1005-1 through 1005-m and for each packet identifies its respective connection i through a connection identifier field contained in the header of the packet (not shown); thereafter, a local connection identifier which identifies the corresponding connection is determined for each packet. The receiver 1010 also determines the length of each received packet using length information contained in the packet header. For each packet, the receiver 1010 also determines whether or not the packet can be queued to connection queue 1020-i corresponding to connection i (described below). If the received packet can be queued, then receiver 1010 stores the packet in the associated connection queue 1020-i, and stores the determined packet length in the associated packet length queue 1026-i (described below). Server 100 (described below) then increments the queue length register 1060-i. If the received packet cannot be queued, then the packet is discarded.

For each connection i of a plurality of switched connections 1 through n, the communication link interface 1500 includes (a) a connection queue 1020-i, which may be a FIFO queue used to store the data packets of connection i, (b) a packet length queue 1026-i, which may be a FIFO queue used to store the lengths of the data packets of connection i, (c) a connection identifier register 1030-i, used to store the local identifier identifying connection i, (d) a rate register 1040-i, used to store the value of data transfer rate reserved to connection i, (e) a timestamp register 1050-i, used to store the timestamp of connection i, and (f) a queue length register 1060-i, used to store the number of data packets of connection i that are currently in the communication link interface 1500 (including transmitter 1200). When a packet associated with connection i is being transmitted by transmitter 1200, the timestamp of connection i is the timestamp of that packet. Also, when connection queue 1020-i is not empty and transmitter 1200 is not transmitting a packet associated with connection i, the timestamp of connection i is the timestamp of the packet at the head of connection queue 1020-i. Further, when connection queue 1020-i is empty and transmitter 1200 is not transmitting a packet associated with connection i, the timestamp of connection i is the timestamp of the last transmitted packet of connection i.

Server 1100 generates a new timestamp for connection i every time a new packet reaches the head of connection queue 1020-i, and stores the value of the newly-generated timestamp in timestamp register 1050-i. Each time transmitter 1200 becomes available for transmission of a new/next packet, server 1100 selects a data packet among all the packets waiting at the head of the queues associated with all the connections that are backlogged at the time of such availability, and sends the selected packet to transmitter 1200. The assignment of a new timestamp to a connection i is based on the following rules, which depend on whether or not the connection i was backlogged before the new packet arrived at the head of connection queue 1020-i.

If connection i was not backlogged before the packet arrived at the head of connection queue 1020-i, meaning that connection i becomes backlogged because of the arrival of the new packet, the new timestamp that is assigned to connection i is generated according to the following expression:

$$F_i^k = \max(F_i^{k-1}, P(a_i^k)) + \frac{l_i^k}{r_i} \quad (4)$$

where $F_i^k$ is the timestamp assigned to the k-th data packet of connection i ($F_i^0=0$), $a_i^k$ is the time of arrival of the k-th data packet of connection i at connection queue 1020-i, $P(a_i^k)$ is the value of the system potential at time $a_i^k$ and is maintained by server 1100, $l_i^k$ is the length of the k-th data packet of connection i, and $r_i$ is the data transfer rate allocated by server 1100 to connection i, normalized to the rate of server 1100.

If connection i was backlogged before the packet arrived at the head of connection queue 1020-i, meaning that the new packet has arrived at the head of connection queue 1020-i as a result of transmitter 1200 having transmitted another packet of connection queue i, the new timestamp to connection i is assigned according to the following expression:

$$F_i^k = F_i^{k-1} + \frac{l_i^k}{r_i} \quad (5)$$

where $F_i^{k-1}$ is the timestamp assigned to the (k−1)-th data packet of connection i.

The system-potential function P appearing in equation (4) and maintained by server 1100 is determined at each time tj when the end of the transmission of the j-th packet in the system occurs. The system-potential function P is computed at time tj according to the following equation:

$$P(t_j) = \max\left(P(t_{j-1}) + t_j - t_{j-1}, \frac{F_{B(t_j)} - L_{B(t_j)}}{r_{B(t_j)}}\right) \quad (6)$$

where:

$B(t_j)$ is the set of all the backlogged connections at time tj, which are all the connections i whose corresponding queue length register 1060-i contains a number greater than 0 at time tj.

$$F_{B(t_j)} = \sum_{i \in B(t_j)} F_i \cdot r_i$$

is the weighted sum of the timestamp values $F_i$ that are stored in the timestamp registers 1050-i of all the backlogged connections i∈B(j) at time tj. In the weighted sum, the weight of each timestamp value $F_i$ is the reserved data transfer rate $r_i$ of the corresponding connection i; the value of $r_i$ is stored in rate register 1040-i.

$$L_{B(t_j)} = \sum_{i \in B(t_j)} l_i$$

is the sum of the values that are stored at the head of the packet length queues 1026-i at time tj computed over all the connections i∈B($t_j$).

$$r_{B(t_j)} = \sum_{i \in B(t_j)} r_i$$

is the sum of the values that are stored in the rate registers 1040-i, computed over all the connections i∈B($t_j$).

tj−1 is the time when the end of the transmission of the (j−1)-th packet occurred.

Server 1100 determines the system-potential function each time such a transmission is completed. Server 1100 also computes the system-potential function every time the k-th packet arrives at the head of connection queue 1020-i and connection i was not backlogged before the k-th packet arrived, and uses it to compute the new timestamp of connection i according to equation (4). In this case, server 1100 computes the value of $P(a_i^k)$ which appears in equation (4) according to the following expression:

$$P(a_i^k) = P(t_h) + a_i^k - t_h \quad (7)$$

where $a_i^k$ is the time of arrival of the k-th data packet of connection i at the head of connection queue 1020-i, $P(t_h)$ is the last value of the system potential computed by server 1100 before $a_i^k$ according to equation (6), where $P(t_h)$ was computed at the time $t_h$ corresponding to the end of the last transmission of a packet by transmitter 1200 which occurred before $a_i^k$.

Each time server 1100 becomes idle as a result of all the connection queues 1020-1 through 1020-n being empty, Server 100 resets to 0 the system potential P and the content of each timestamp register 1050-i.

Each time transmitter 1200 becomes available for the transmission of a new/next packet, server 1100 selects the next connection i to be serviced. Connection i is selected for transmission if the content of queue length register 1060-i is greater than 0 and the content of timestamp register 1050-i has a value that is the minimum among the values contained in the timestamp registers 1050-h associated with all backlogged connections h.

When a connection i is selected for transmission by server 1100, then the data packet at the head of the corresponding connection queue 1020-i is unloaded from that queue and supplied to transmitter 1200.

When transmitter 1200 completes the transmission over the output link 1300 of a packet belonging to connection i, server 1100 decrements the content of queue length register 1060-i. If the decremented value stored in the queue length register 1060-i is greater than 0, then server 1100 removes the old value at the head of packet length queue 1026-i, and the value at the head of packet length queue 1026-i becomes the next value in packet length queue 1026-i. Then, server 1100 generates the new timestamp for connection i. Server 1100 then updates the system-potential function P according to equation (6) using (a) the value of the newly-generated timestamp of connection i, (b) the previous value of the timestamp of connection i stored in timestamp register 1050-i, (c) the old value at the head of packet length queue 1026-i, (d) the new value at the head of packet length queue 1026-i, (e) and the value in rate register 1040-i. Then, server 1100 removes the previous value in timestamp register 1050-i, and stores the value of the newly-generated timestamp of connection i in timestamp register 1050-i. If the decremented value stored in queue length register 1060-i is 0, then server 1100 updates the system-potential function P according to equation (6) using (a) the content of timestamp register 1050-i, (b) the content of rate register 1040-i, and (c) the value at the head of packet length queue 1026-i. Then, server 1100 removes the previous value at the head of packet length queue 1026-i.

Figure 8:
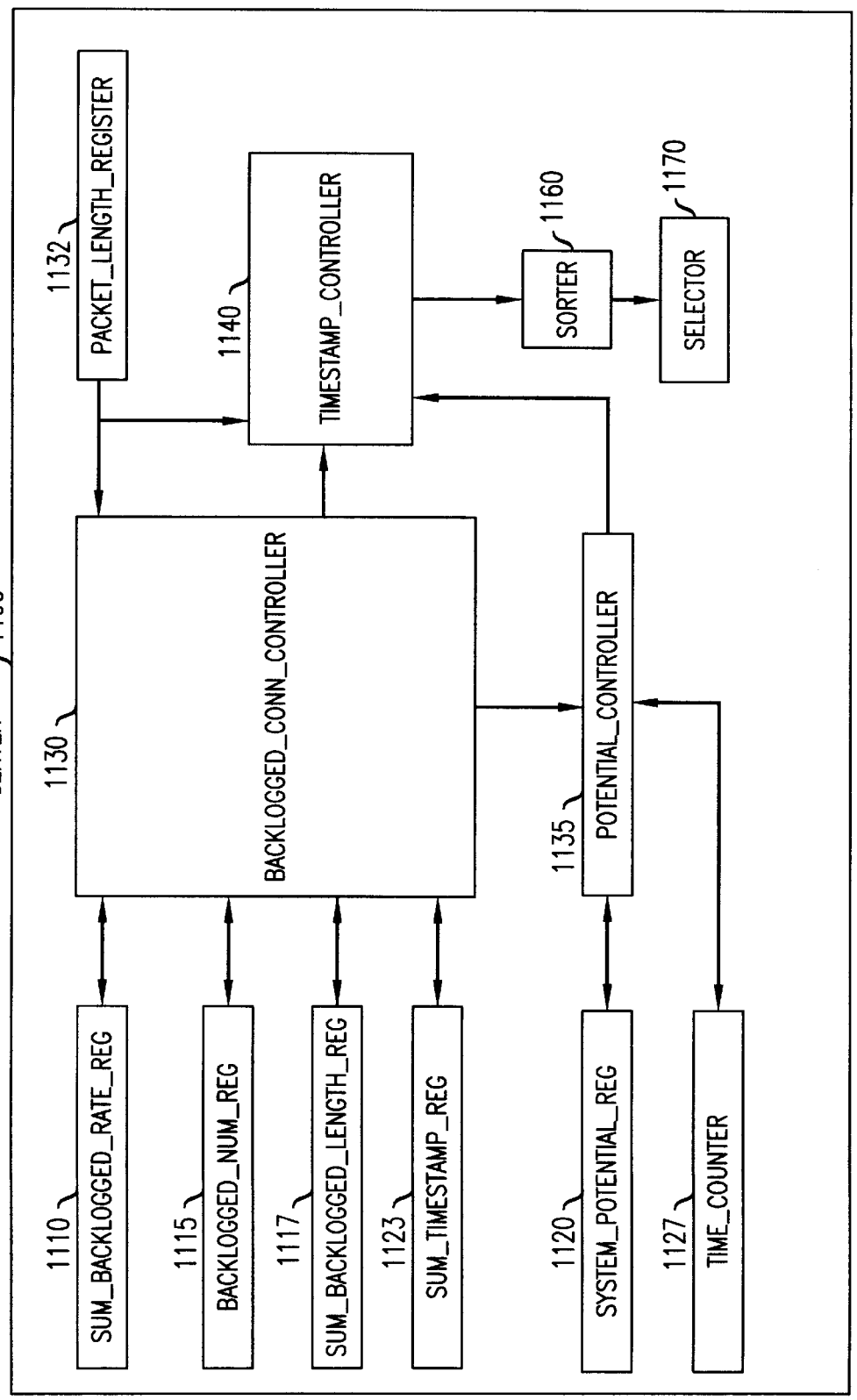
FIG. 8 is a block diagram of the server that is part of the communication link interface of FIG. 7.

FIG. 8 shows an illustrative embodiment of an apparatus or server 1100 according to a second illustrative embodiment of the present invention.

Specifically, server 1100 includes (a) a register 1110, for storing the sum of the reserved service rates of all backlogged connections (the content of register 1110 is called $r_{B(tj)}$ in equation (6) above); (b) a register 1115, for storing the number of backlogged connections (the content of register 1115 is called $n_{B(tj)}$ in equation (6) above); (c) a register 1117, for storing the sum of the packet lengths that are currently at the head of packet length queues 1026-1 through 1026-n (the content of register 1117 is called $L_{B(tj)}$ in equation (6) above); (d) a register 1120, for storing the current value of the system-potential function (the content of register 1120 is called P in equation (4), equation (6), and equation (7)); (e) a register 1123, for storing the weighted sum of the timestamps of all backlogged connections (the content of register 1123 is called $\overline{F}_{B(tj)}$ in equation (6) above); and (f) a counter 1127, for storing the time elapsed since the end of the latest transmission of a packet in the system by transmitter 1200 (the counter 1127 is used to compute the value of (tj−tj−1) which appears in equation (6) above and the value of ($a_i^k$−tj) which appears in equation (7) above). Server 1100 also includes (a) a controller 1130, which (i) updates the contents of registers 1110, 1115, 1117 and 1123, (ii) supplies the content of registers 1110, 1117 and 1123 to controller 1135, and (iii) supplies to controller 1140 the old value of the timestamp stored in the timestamp register 1050-i of the connection i for which a new timestamp must be computed; (b) a register 1132, used to store the length of the last received packet; (c) a controller 1135 which determines, using the contents of registers 1110, 1117, 1120, 1123 and 1127, and 1050-i, and the new value of the timestamp of connection i, the value of the system potential according to equation (6) each time transmitter 1200 completes the transmission of a packet associated with connection i in the system, and then resets the content of register 1127. Controller 1135 also determines the system potential according to equation (7) each time a packet arrives at the head of its connection queue 1020-i when connection i is not backlogged, and provides the value of the system potential (determined according to equation (7) to controller 1140. Server 100 also includes a controller 1140, which determines the timestamp to be assigned to connection i when a new packet arrives at the head of its connection queue 1020-i, according to (i) equation (4) if connection i was not backlogged before the new packet arrived at the head of connection queue 1020-i, and (ii) equation (5) if connection i was already backlogged before the new packet arrived at the head of the connection queue 1020-i.

Server 110 further includes a sorter 1160 and a selector 1170. Whenever transmitter 1200 becomes available for a new transmission, then sorter 1160 supplies the identifier of the backlogged connection i whose timestamp register 1050-i contains the minimum value among all backlogged connections. Selector 1170 removes from connection queue 1020-i the packet that is at the head of connection queue 1020-i corresponding to connection i, whose identifier has been supplied by sorter 1160, and supplies the packet to transmitter 1200.

Figure 9A:
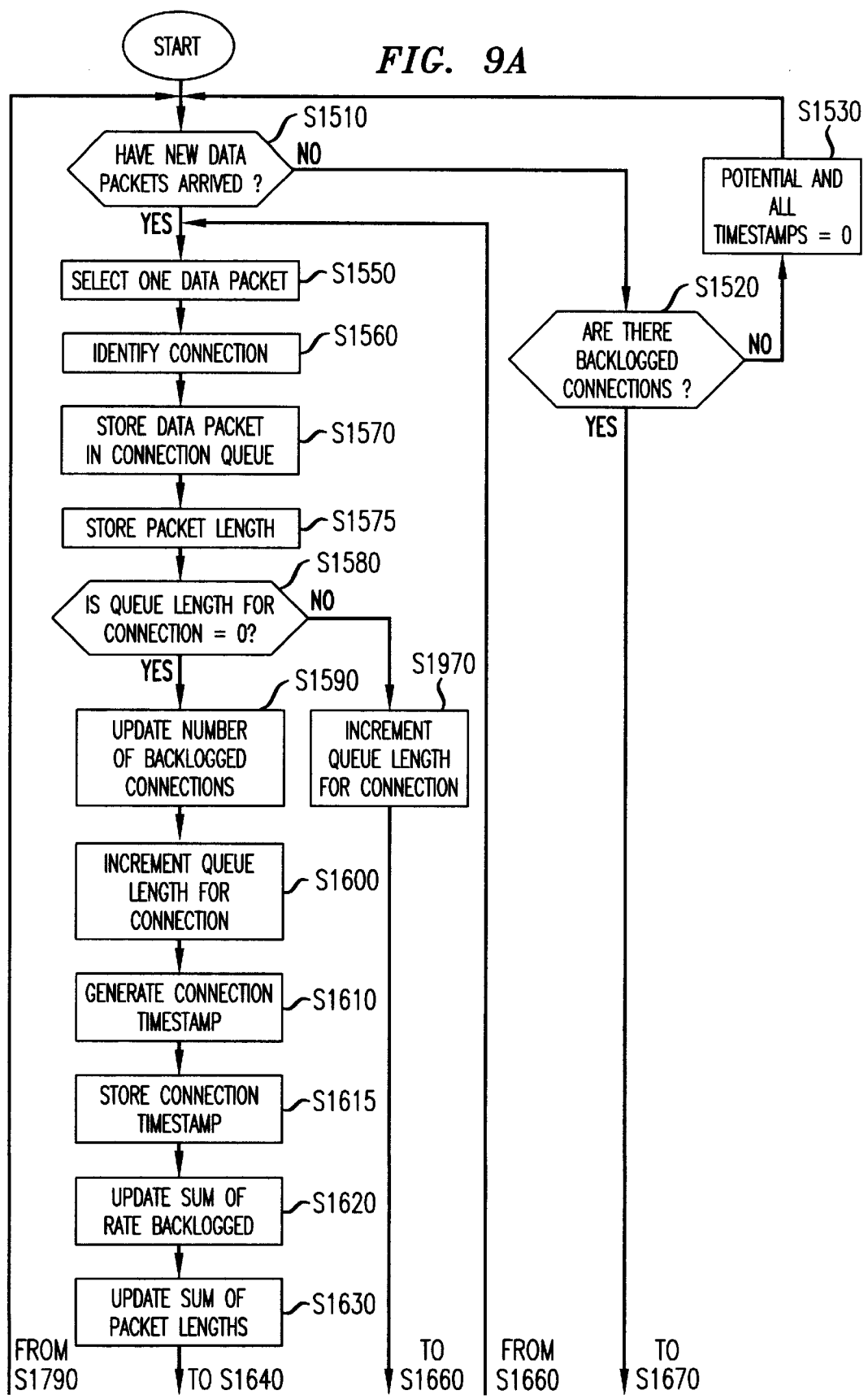
FIGS. 9A–9C illustrate in flowchart form a second method of scheduling the transmission of data packets in a communication link interface of FIG. 7 in accordance with the principles the present invention.
Figure 9B:
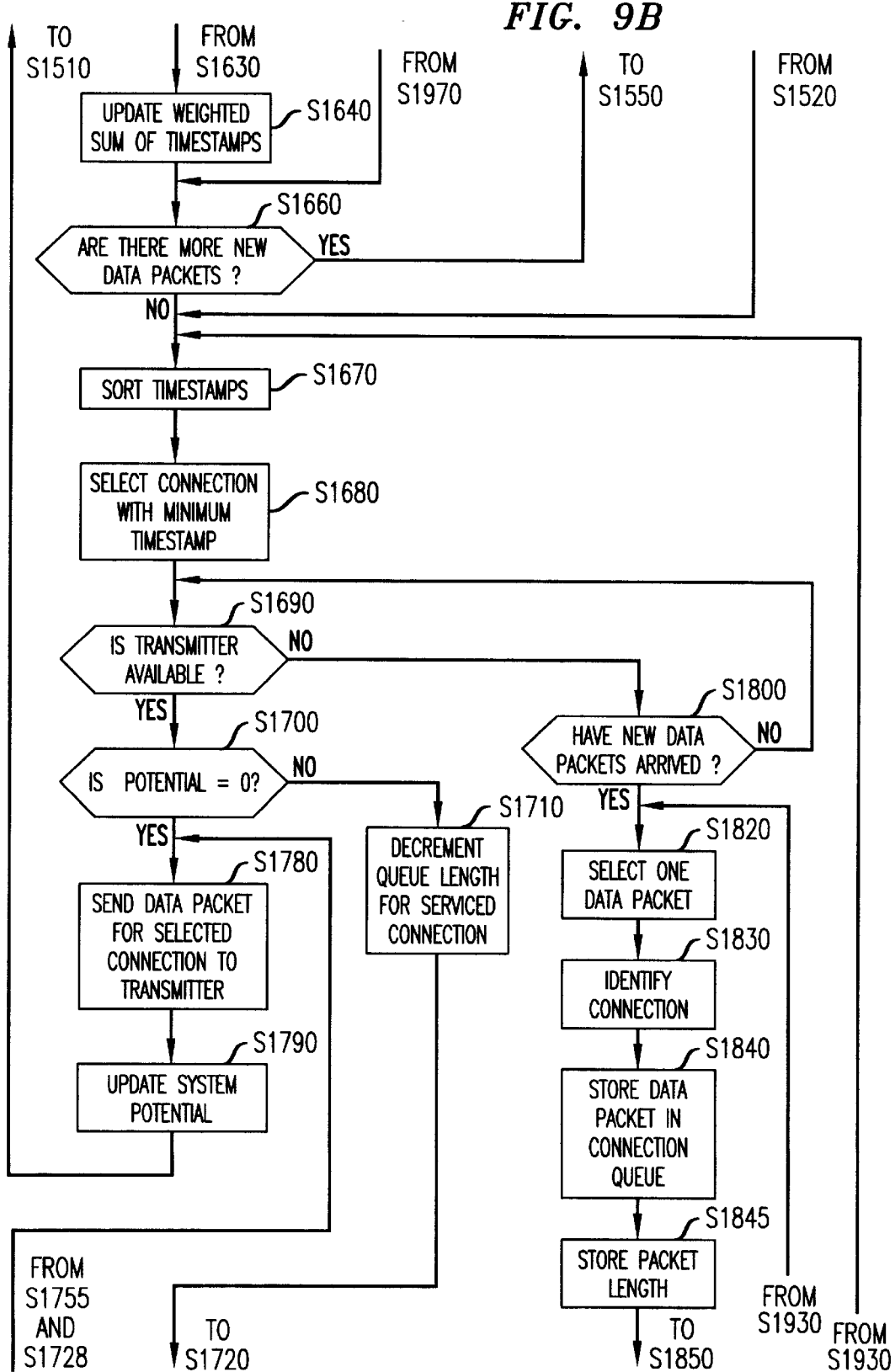
Figure 9C:
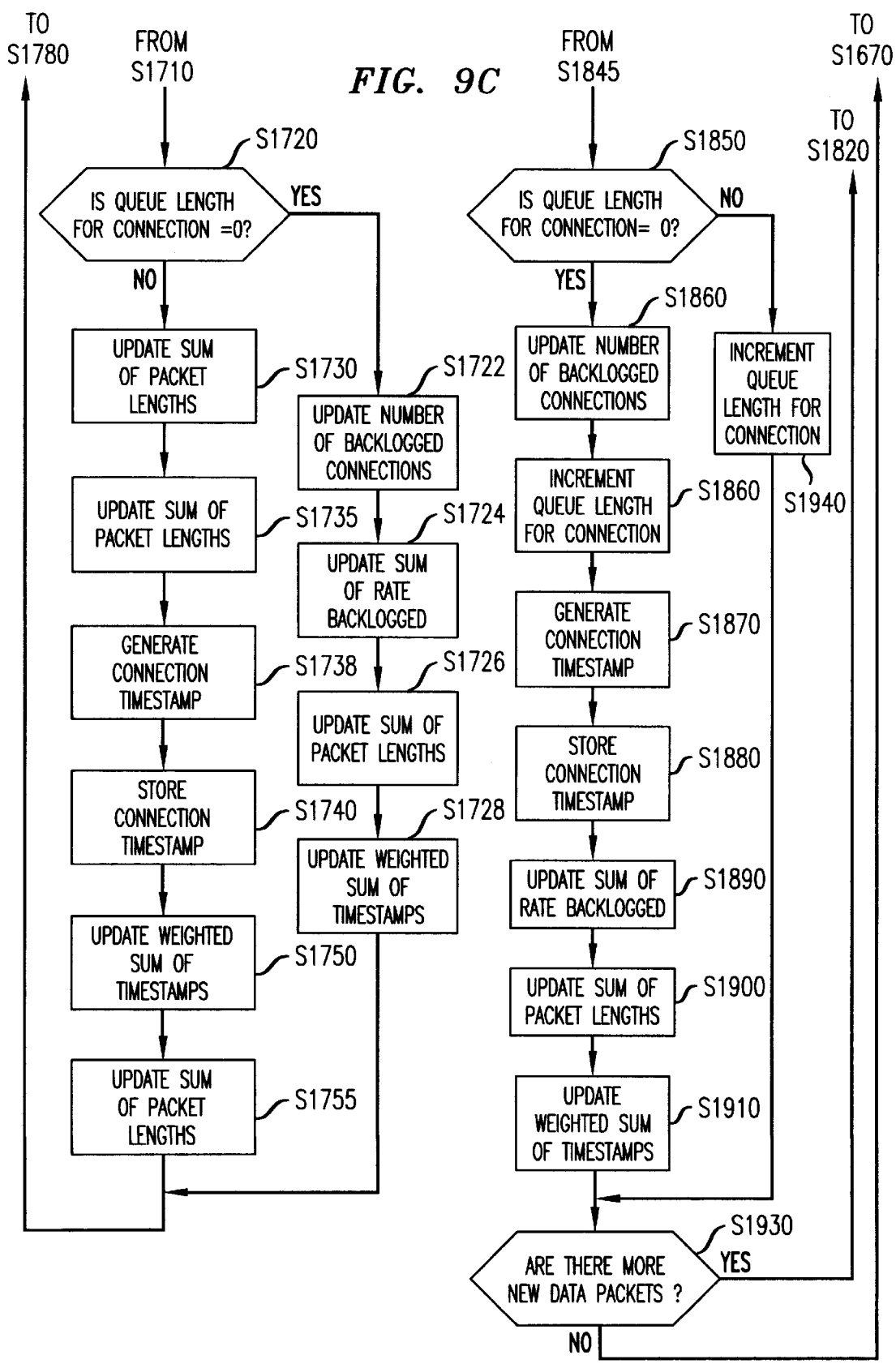

FIGS. 9A through 9C (which should be arranged with respect to one another as shown in FIG. 10) show in flow chart form the way in which server 1100 a second illustrative method of scheduling the transmission of data packets of different sizes according to the present invention. Note that FIGS. 9A–9C are somewhat similar to FIGS. 5A–5C. As such, the following discussion of FIGS. 9A–9C is somewhat similar to the discussion of FIGS. 5A–5C, with the exception that the discussion of FIGS. 9A–9C is directed to, among other things, equations (4) through (7), and includes additional operation steps directed to the processing of the length of the received packets.

Referring to FIGS. 9A–9C, in step S1510, if new data packets have arrived at receiver 1010, then server 1100 proceeds to step S1550. Otherwise, server 1100 proceeds to step S1520.

In step S1520, if no backlogged connections are available (which is indicated by the content of register 1115 being equal to 0), server 1100 proceeds to step S1530. Otherwise, server 1100 proceeds to step S1670.

In step S1530, server 1100 resets to 0 the content of register 1120 (which stores the value of the system potential), of counter 1127, and all of the registers 1050-1 through 1050-n. Server 1100 then proceeds to step S1510.

In step S1550, server 1100 selects one of the data packet just arrived at the receiver 1010, and then proceeds to step S1560.

In step S1560, server 1100 identifies the connection i corresponding to the packet selected in step S1550. Server 1100 identifies connection i using a connection identifier contained in the header of the received packet (not shown). The identification of connection i allows to identify connection queue 1020-i corresponding to connection i, where the packet should be stored. Server 1100 then proceeds to step S1570.

In step S1570, server 1100 stores the packet in connection queue 1020-i, and then proceeds to step S1575.

In step S1575, server 1100 stores the length of the packet in packet length queue 1026-i and in register 1132, and then proceeds to step S1580.

In step S1580, if the content of queue length register 1060-i is 0 (connection i is not backlogged), then server 1100 proceeds to step S1590. Otherwise, server 1100 proceeds to step S1970.

In step S1590, server 1100 (more specifically, the controller 1130) increments the content of register 1115. Server 1100 then proceeds to step S1600.

In step S1600, server 1100 increments the content of queue length register 1060-i, and then proceeds to step S1610.

In step S1610, server 1100 (more specifically the controller 1135) computes the value of $P(a_i^k)$, which appears in equation (4), according to equation (7), and provides the value to controller 1140. Then, server 1100 (more specifically, controller 1140) determines the new timestamp of connection i identified in step S1560 according to equation (4). Server 1100 then proceeds to step S1615.

In step S1615, server 1100 stores the timestamp of connection i in timestamp register 1050-i, and then proceeds to step S1620.

In step S1620, server 1100 (more specifically, the controller 1130) adds the content of rate register 1040-i to the content of register 1110. Server 1100 then proceeds to step S1630.

In step S1630, server 1100 (more specifically, the controller 1130) adds the content of register 1132 to the content of register 1117. Server 1100 then proceeds to step S1640.

In step S1640, server 1100 (more specifically, the controller 1130) adds the product of the contents of timestamp register 1050-i and rate register 1040-i to the content of register 1123. Server 1100 then proceeds to step S1660.

In step S1660, if additional new data packets have been received at the receiver 1010, then server 1100 proceeds to step S1550. Otherwise, server 1100 proceeds to step S1670.

In step S1670, sorter 1160 identifies the minimum among the contents of all registers 1050-j corresponding to backlogged connections j, and then proceeds to step S1680.

In step S1680, selector 1170 identifies the connection i corresponding to the minimum timestamp found in step S1670. Server 1100 then proceeds to step S1690.

In step S1690, if transmitter 1200 is already transmitting a packet over output link 1300 and is therefore not available to transmit an other packet, then server 1100 proceeds to step S1800. Otherwise, server 1100 proceeds to step S1700.

In step S1700, if the content of register 1120, which stores the value of the system potential, is equal to 0, then server 1100 proceeds to step S1780. Otherwise, server 1100 proceeds to step S1710.

In step S1710, server 1100 decrements the queue length register 1060-h for the connection h corresponding to the last packet being transmitted by transmitter 1200, and then proceeds to step S1720.

In step S1720, server 1100 proceeds to step S1722 if the content of queue length register 1060-h of connection h corresponding to the last packet being transmitted by transmitter 1200 is 0. Otherwise, server 1100 proceeds to step S1730.

In step S1722, server 1100 (more specifically, the controller 1130) decrements the content of register 1115. Server 1100 then proceeds to step S1724.

In step S1724, server 1100 (more specifically, the controller 1130) subtracts from the content of register 1110 the content of rate register 1040-h of connection h corresponding to the last packet being transmitted by transmitter 1200. Server 1100 then proceeds to step S1726.

In step S1726, server 1100 (more specifically, the controller 1130) subtracts the value at the head of packet length queue 1026-h of connection h corresponding to the last packet being transmitted by transmitter 1200 from the content of register 1117 and removes the value at the head of packet length queue 1026-h. Server 1100 then proceeds to step S1728.

In step S1728, server 1100 (more specifically, the controller 1130) subtracts the product of the contents of timestamp register 1050-h and rate register 1040-h of connection h corresponding to the last packet being transmitted by transmitter 1200 from the content of register 1123. Server 1100 then proceeds to step S1780.

In step S1730, server 1100 (more specifically, the controller 1130) subtracts the product of the contents of timestamp register 1050-h and rate register 1040-h of connection h corresponding to the last packet being transmitted by transmitter 1200 from the content of register 1123. Server 1100 then proceeds to step S1735.

In step S1735, server 1100 (more specifically, the controller 1130) subtracts the value at the head of packet length queue 1026-h of connection h corresponding to the last packet being transmitted by transmitter 1200 from the content of register 1117 and removes the value at the head of packet length queue 1026-h. Server 1100 then proceeds to step S1738.

In step S1738, server 1100 (more specifically, the controller 1140) determines the new timestamp of connection h corresponding to the last packet being transmitted by transmitter 1200 according to equation (5). Server 1100 then proceeds to step S1740.

In step S1740, server 1100 stores the value of the newly-generated timestamp of connection h corresponding to the last packet being transmitted by transmitter 1200 in timestamp register 1050-h, and then proceeds to step S1750.

In step S1750, server 1100 (more specifically, the controller 1130) adds the product of the contents of timestamp register 1050-h and rate register 1040-h of connection h corresponding to the last packet being transmitted by transmitter 1200 to the content of register 1123. Server 1100 then proceeds to step S1755.

In step S1755, server 1100 (more specifically, the controller 1130) adds the value at the head of packet length queue 1026-h of connection h corresponding to the last packet being transmitted by transmitter 1200 to the content of register 1117. Server 1100 then proceeds to step S1780.

In step S1780, the packet at the head of connection queue 1020-i corresponding to connection i identified in step S1680 by server 1100 (more specifically, by the selector 1170) is sent to transmitter 1200. Server 1100 then proceeds to step S1790.

In step S1790, server 1100 (more specifically, the controller 1135) determines the new value of the system potential according to equation (6), using the content of registers 1110, 1115, 1117, 1120, and 1123, and stores it in register 1120. Server 1100 also resets the content of counter 1127. Server 1100 then proceeds to step S1510.

In step S1800, if receiver 1010 has received new data packets, then server 1100 proceeds to step S1820. Otherwise, server 1100 proceeds to step S1690.

In step S1820, server 1100 selects one of the newly received data packets, and then proceeds to step S1830.

In step S1830, server 1100 identifies the connection w corresponding to the packet selected in step S1820, and then identifies connection w through a connection identifier contained in the header of the packet (not shown). The identification of connection w allows to identify connection queue 1020-w corresponding to connection w, where the packet should be stored. Server 1100 then proceeds to step S1840.

In step S1840, server 1100 stores the packet selected in step S1820 in connection queue 1020-w, and then proceeds to step S1845.

In step S1845, server 1100 stores the length of the packet selected in step S1820 in packet length queue 1026-w and in register 1132, and then proceeds to step S1850.

In step S1850, server 1100 proceeds to step S1860 if the content of queue length register 1060-w is 0 (connection w is not backlogged). Otherwise, server 1100 proceeds to step S1940.

In step S1860, server 1100 (more specifically, the controller 1130) increments the content of register 1115, and then proceeds to step S1870.

In step S1870, server 1100 increments the content of queue length register 1060-w, and then proceeds to step S1880.

In step S1880, server 1100 (more specifically the controller 1135) determines the value of $P(a_t^k)$, which appears in equation (4), according to equation (7), and provides the determined value to controller 1140. Server 1100 (more specifically, the controller 1140) then determines the new timestamp of connection w identified in step S1830 according to equation (4). Server 1100 then proceeds to step S1885.

In step S1885, server 1100 stores the timestamp of connection w in timestamp register 1050-w, and then proceeds to step S1890.

In step S1890, server 1100 (more specifically, the controller 1130) adds the content of rate register 1040-w to the content of register 1110. Server 1100 then proceeds to step S1900.

In step S1900, server 1100 (more specifically, the controller 1130) adds the content of register 1132 to the content of register 1117. Server 1100 then proceeds to step S1910.

In step S1910, server 1100 (more specifically, the controller 1130) adds the product of the contents of timestamp register 1050-w and rate register 1040-w to the content of register 1123. Server 1100 then proceeds to step S1930.

In step S1930, server 1100 proceeds to step S1820 if additional new data packets are available. Otherwise, server 1100 proceeds to step S1670.

In step S1940, server 1100 increments the content of queue length register 1060-w corresponding to connection w identified in step S1830, and then proceeds to step S1930.

In step S1970, server 1100 increments the content of queue length register 1060-i corresponding to connection i identified in step S1560, and then proceeds to step S1975.

The illustratvie embodiments described above are but two example of the principles that may be used to schedule the transmission of data packets with fixed size and with variable size according to the present invention. Those skilled in the art will be able to devise numerous arrangements which, although not explicitly shown or described herein, nevertheless embody those principles that are within the spirit and scope of the present invention as defined in the appended claims.

We claim:

1. A method of servicing, at a predetermined service rate, a plurality of queues containing data packets, each of said queues being associated with respective connections, said connections traversing an associated communications switch, each of said connections being allocated a respective data transfer rate, said method comprising:

responsive to receiving a plurality of data packets via a plurality of data links, identifying for each received data packet the respective one of said connections and identifying the associated one of said queues, storing each of the received data packets in their respective identified queue, associating a timestamp with each connection whose associated queue has at least one data packet waiting therein, in which said connection is identified as a backlogged connection, and generating a timestamp associated with each connection each time a new data packet reaches the head of the associated queue, storing in memory the timestamps associated with respective ones of the backlogged connections, determining which of the timestamps associated with respective ones of the backlogged connections has the smallest value among all of the timestamps, identifying the associated connection, removing a data packet from the head of that one of the queues associated with the identified connection and transmitting the removed data packet to an output, in which the timestamp associated with a backlogged connection, generated each time a new data packet reaches the head of the associated queue, is generated as a maximum value between a previous value of the timestamp assigned to the connection and a current value of at least one function or system potential, said maximum value incremented by the inverse of the data transfer rate allocated to the connection normalized to the rate of the server, if the connection associated with the data packet was not backlogged before the packet reaches the head of the associated queue, in which the timestamp associated with a backlogged connection, generated each time a new data packet reaches the head of the associated queue, is generated as the previous value of the timestamp of the connection incremented by the inverse of the data transfer rate allocated to the connection normalized to the rate of the server, if the connection associated with the data packet was backlogged before the packet arrived at the head of the associated queue, wherein a value for the system potential is generated following the transmission of a packet in the system as the maximum value between the latest value of the system potential incremented by a first predetermined value and the weighted sum of the timestamp values associated with all the currently backlogged connections, in which the weight of each timestamp value in the weighted sum is the data transfer rate allocated to the associated connection, and in which said weighted sum is decremented by the number of connections that are currently backlogged, in which that result is then divided by the sum of the values of the data transfer rates allocated to all connections that are currently backlogged.

2. The method of claim 1 further comprising the step of responsive to when there are no data packets waiting in the plurality of queues, resetting to zero the value of the system potential and the values of the timestamps associated with respective ones of all the connections.

3. The method of claim 1 further comprising the step of responsive to when there are no data packets waiting in the plurality of queues, setting the value of the system potential equal to or larger than the largest of the timestamp values associated with the connections.

4. The method of claim 1 further comprising the step of following the transmission of a packet in the system, determining the value of the at least one function or system potential as a maximum value between the latest value of the system potential incremented by the first predetermined value and the value of the timestamp associated with the connection served most recently by the server, said value of the timestamp associated with the connection served most recently by the server decremented by the number of all the connections that are currently backlogged and then divided by the sum of the values of the data transfer rates allocated to all connections that are currently backlogged.

5. The method of claim 1, further comprising:

determining the length of each received data packet and storing the determined length in a memory location associated with the queue associated with the data packet, in which the timestamp associated with a backlogged connection, generated each time a new data packet reaches the head of the associated queue, is generated as the maximum value between the previous value of the timestamp assigned to the connection and the current value of at least one function or system potential, said maximum value incremented by the length of the data packet divided by the data transfer rate allocated to the connection normalized to the rate of the server, if the connection associated with the data packet was not backlogged before the packet arrived at the head of the associated queue, in which the timestamp associated with a backlogged connection, generated each time a new data packet reaches the head of the associated queue, is generated as the value of the previous value of the timestamp of the connection incremented by the length of the data packet that has just reached the head of the associated queue divided by the data transfer rate allocated to the connection normalized to the rate of the server, if the connection associated with the data packet was backlogged before the packet arrived at the head of the associated queue, wherein a value for the system potential is generated following the transmission of a packet in the system as a maximum value between the latest value of the system potential incremented by a first duration factor, in which the duration factor is equal to the duration of the period of time that starts from the time when the previous value of the system potential was generated and ends at the current time when the value of the system potential is generated, and the weighted sum of the timestamp values associated with the currently backlogged connections, in which the weight of each timestamp value in the weighted sum is the allocated data transfer rate of the associated connection, and in which said weighted sum is decremented by the sum of the lengths of the data packets at the head of all queues associated with connections that are currently backlogged and then divided by the sum of the values of the data transfer rates allocated to all connections that are currently backlogged, wherein a value for the system potential is generated following the receiver receiving a packet associated with a connection that was not backlogged prior of such arrival as the latest value of the system potential incremented by the first duration factor.

6. The method of claim 5 further comprising the step of responsive to when there are no data packets waiting in the plurality of queues, resetting to zero the value of the system potential and the values of the timestamps associated with respective ones of all the connections.

7. The method of claim 5 further comprising the step of p1 responsive to when there are no data packets waiting in the plurality of queues, setting the value of the system potential equal to or larger than the largest of the timestamp values associated with the connections.

8. The method of claim 5 further comprising the step of p1 following the transmission of a packet in the system, determining the value of the at least one function or system potential as the maximum value between the latest value of the at least one function or system potential incremented by the first duration factor and the value of the timestamp associated with the connection served most recently by the server, said value of the timestamp associated with the connection served most recently by the server decremented by the sum of the lengths of the data packets at the head of all queues associated with connections that are currently backlogged and then divided by the sum of the values of the data transfer rates allocated to all connections that are currently backlogged.

9. An apparatus for servicing, at a predetermined service rate, a plurality of queues containing data packets, said queues being associated with respective connections, said connections traversing an associated communications switch, each of said connections being allocated a respective data transfer rate, said apparatus comprising:

memory forming the plurality of queues associated with respective ones of said connections, a receiver for receiving a plurality of data packets via a plurality of data links, for identifying for each received data packet the respective one of said connections, and identifying the associated one of said queues and for storing each of the received data packets in their respective identified queue, a first controller for associating a timestamp with each connection whose associated queue has at least one data packet waiting therein, in which said connection is identified as a backlogged connection, and for generating a timestamp associated with each connection each time a new data packet reaches the head of the associated queue, and for storing in memory the timestamps associated with respective ones of the backlogged connections, a second controller for determining which of the timestamps associated with respective ones of the backlogged connections has the smallest value among all of the timestamps, and for identifying the associated connection, and for removing a data packet from the head of that one of the queues associated with the identified connection and transmitting the removed data packet to an output, said first controller including apparatus, operative when the connection associated with a data packet that has just reached the head of the associated queue was not backlogged before that packet reached the head of the associated queue, for then generating the timestamp associated with that backlogged connection as a maximum value between the previous value of the timestamp assigned to the connection and the current value of at least one function or system potential, said maximum value incremented by the inverse of the data transfer rate allocated to the connection normalized to the rate of the server, and operative when the connection associated with a data packet that has just reached the head of the associated queue was backlogged before that packet reached the head of the associated queue, for then generating the timestamp associated with that backlogged connection as the previous value of the timestamp of the connection incremented by the inverse of the data transfer rate allocated to the connection normalized to the rate of the server, operative following the transmission of a packet in the system for generating a value for the system potential as the maximum value between the latest value of the system potential incremented by a first predetermined value and the weighted sum of the timestamp values associated with all the currently backlogged connections, in which the weight of each timestamp value in the weighted sum is the data transfer rate allocated to the associated connection, and in which said weighted sum is decremented by the number of connections that are currently backlogged, in which that result is then divided by the sum of the values of the data transfer rates allocated to all connections that are currently backlogged.

10. The apparatus of claim 9 wherein said first controller further includes apparatus, responsive to when there are no data packets waiting in the plurality of queues, for then resetting to zero the value of the system potential and the values of the timestamps associated with respective ones of all the connections.

11. The apparatus of claim 9 wherein said first controller further includes apparatus, responsive to when there are no data packets waiting in the plurality of queues, for then setting the value of the system potential equal to or larger than the largest of the timestamp values associated with the connections.

12. The apparatus of claim 9 wherein said first controller further includes apparatus, operative following the transmission of a packet in the system, for determining the value of the at least one function or system potential as the maximum between the latest value of the system potential incremented by the first predetermined value and the value of the timestamp associated with the connection served most recently by the server, said value of the timestamp associated with the connection served most recently by the server decremented by the number of all the connections that are currently backlogged and then divided by the sum of the values of the data transfer rates allocated to all connections that are currently backlogged.

13. The apparatus of claim 9, wherein the receiver further includes apparatus for determining the length of each received data packet and storing the determined length in a memory location associated with the queue associated with the data packet, and the first controller including apparatus, operative when the connection associated with a data packet that has just reached the head of the associated queue was not backlogged before that packet reached the head of the associated queue, for then generating the timestamp associated with that backlogged connection as the maximum value between the previous value of the timestamp assigned to the connection and the current value of at least one function or system potential, said maximum value incremented by the length of the data packet divided by the data transfer rate allocated to the connection normalized to the rate of the server, operative when the connection associated with a data packet that has just reached the head of the associated queue was backlogged before that packet reached the head of the associated queue, for then generating the timestamp associated with that backlogged connection as the previous value of the timestamp of the connection incremented by the length of the data packet that has just reached the head of the associated queue divided by the data transfer rate allocated to the connection normalized to the rate of the server, operating following the transmission of a packet in the system for generating a value for the system potential as the maximum value between the latest value of the system potential incremented by a first duration factor, in which the duration factor is equal to the duration of the period of time that starts from the time when the previous value of the system potential was generated and ends at the current time when the value of the system potential is generated, and the weighted sum of the timestamp values associated with the currently backlogged connections, in which the weight of each timestamp value in the weighted sum is the allocated data transfer rate of the associated connection, and in which said weighted sum is decremented by the sum of the lengths of the data packets at the head of all queues associated with connections that are currently backlogged and then divided by the sum of the values of the data transfer rates allocated to all connections that are currently backlogged, operating following the receiver receiving a packet associated with a connection that was not backlogged prior of such arrival for generating a value for the system potential as the latest value of the system potential incremented by the first duration factor.

14. The apparatus of claim 13 wherein said first controller further includes apparatus, responsive to when there are no data packets waiting in the plurality of queues, for then resetting to zero the value of the system potential and the values of the timestamps associated with respective ones of all the connections.

15. The apparatus of claim 13 wherein said first controller further includes apparatus, responsive to when there are no data packets waiting in the plurality of queues, for then setting the value of the system potential equal to or larger than the largest of the timestamp values associated with the connections.

16. The apparatus of claim 13 wherein said first controller further includes apparatus, operative following the transmission of a packet in the system, for determining the value of the at least one function or system potential as the maximum value between the latest value of the at least one function or system potential incremented by the first duration factor and the value of the timestamp associated with the connection served most recently by the server, said value of the timestamp associated with the connection served most recently by the server decremented by the sum of the lengths of the data packets at the head of all queues associated with connections that are currently backlogged and then divided by the sum of the values of the data transfer rates allocated to all connections that are currently backlogged.

17. A method of servicing a plurality of queues containing data packets at a predetermined rate, said queues being associated with respective connections through an associated communications switch, each of said connections being associated with a respective data transfer rate, said method comprising:

responsive to receiving a plurality of data packets via a plurality of data links, identifying for each received data packet the respective one of said connections and identifying the associated one of the queues as a function of the identified connection, storing each of the received data packets in their respective identified queues, generating a timestamp for each connection whose associated queue has least one data packet stored therein and the data packet has reached the head of that queue, in which a connection associated with such a queue is identified as a backlogged connection, storing in memory the timestamps in association with respective ones of the backlogged connections, determining which of the time stamps associated with respective ones of the backlogged connections has the smallest value, removing a data packet from the head of that one of the queues associated with the determined connection and transmitting the removed data packet to an output, if the determined connection was not backlogged before the packet reached the head of the associated queue, then generating the timestamp for that queue as a maximum value within a range of values extending from the previous value of the timestamp generated for the associated connection and to a current value of a system potential, in which the maximum value is incremented by the inverse of the data transfer rate allocated to the associated connection normalized to the service rate, if the determined connection was backlogged before the packet reached the head of the associated queue, then generating the timestamp when a new data packet arrives at the head of a queue associated with a backlogged connection as a function of the value of the previous timestamp generated for that connection incremented by the inverse of the data transfer rate allocated to the connection normalized to the service rate, and following the transmission of a packet in the system, generating a value for the system potential as a maximum value within a range extending from the latest value of the system potential incremented by a first predetermined value and a weighted sum of the timestamp values associated with all of the currently backlogged connections, in which the weight of each timestamp value in the weighted sum is the data transfer rate allocated to the associated connection, and in which the weighted sum is decremented by the number of connections that are currently backlogged, in which that result is then divided by the sum of the values of the data transfer rates allocated to all connections that are currently backlogged.

18. The method of claim 17 further comprising the step of responsive to no data packets waiting in the plurality of queues, setting to zero the value of the system potential and the values of the timestamps associated with respective ones of the connections.

19. The method of claim 17 further comprising the step of responsive to no data packets waiting in the plurality of queues, setting the value of the system potential equal to or larger than the largest of the timestamp values.

20. The method of claim 17 further comprising the step of following the transmission of a packet in the system, determining the value of the system potential as a maximum value in a range of values extending from the latest value of the system potential incremented by the first predetermined value and the value of the timestamp associated with the most recently established connection served by the system, said value of the timestamp associated with the latter connection being decremented by the number of all the connections that are currently backlogged and then divided by the sum of the values of the data transfer rates allocated to all connections that are currently backlogged.

21. The method of claim 17 further comprising the step of determining the length of each received data packet and storing the determined length in a memory location associated with the identified connection,
determining, each time a data packet stored in a queue associated with a backlogged connection reaches the head of that queue, a timestamp as a maximum value ranging between the previous value of the timestamp assigned to the backlogged connection and the current value of the system potential, in which the maximum value is incremented by the length of the data packet divided by the data transfer rate allocated to the associated connection normalized to the service rate, if associated connection was not backlogged before the packet reached the head of the associated queue,
when a data packet reaches the head of a queue associated with a backlogged connection and if that connection was backlogged before the packet reached the head of the associated queue, generating a timestamp as the value of the previous value of the timestamp for that connection incremented by the length of the latter data packet divided by the data transfer rate allocated to the associated backlogged connection normalized to the service rate of the server, and
following the transmission of data packet, determining the system potential system as a maximum value in a range of values extending from the current value of the system potential incremented by the first predetermined value and the weighted sum of the timestamp values respectively associated with the currently backlogged connections, in which the weight of each timestamp value in the weighted sum is the data transfer rate allocated to the associated connection, and in which the weighted sum is decremented by the sum of the lengths of the data packets at the head of queues respectively associated with connections that are currently backlogged and then divided by the sum of the values of the data transfer rates allocated to all such connections.

22. The method of claim 21 further comprising the step of responsive to when there are no data packets waiting in the plurality of queues, resetting the value of the system potential and the value of all the timestamps to zero.

23. The method of claim 21 further comprising the step of responsive to when there are no data packets waiting in the plurality of queues, setting the value of the system potential equal to or larger than the value of the timestamp having the largest value.

24. The method of claim 21 further comprising the step of following the transmission of a packet, determining the value of the system potential as a maximum value in a range of values extending from the current value of the system potential incremented by the predetermined value and the value of the timestamp associated with the connection currently being served by the system, in which the latter timestamp is decremented by the sum of the lengths of the data packets that have reached the head of queues associated with connections that are currently backlogged and then divided by the sum of the values of the data transfer rates allocated to all such connections.

25. Apparatus for servicing a plurality of queues containing received data packets at an predetermined rate, said queues being associated with respective connections established through an associated communications switch, each of said connections being associated with a respective data transfer rate, said apparatus comprising:
memory forming a plurality of queues associated with respective ones of said connections,
a receiver for receiving data packets via a plurality of data links, and identifying for each received data packet the associated one of said connections and identifying the associated one of the queues as a function of the identified connection and for storing each of the received data packets in their respective identified queues,
a first controller for generating a timestamp for each connection whose associated queue has least one data packet stored therein and a data packet priorly stored in the associated queue has reached the head of that queue, in which a connection associated with such a queue is identified as a backlogged connection, and for storing the timestamps in respective memory locations as they are generated,
a second controller for determining which one of the time stamps associated with respective ones of the backlogged connections has the smallest value among all of the time stamps, for removing a data packet from the head of that one of the queues associated with the determined connection and transmitting the removed data packet to an output,
said second controller including apparatus, operative if the determined connection was not backlogged before the packet reached the head of the associated queue, for then generating the timestamp for that queue as a maximum value within a range of values extending from the previous value of the timestamp generated for the associated connection to a current value of a system potential, in which the maximum value is incremented by an inverse of the data transfer rate allocated to the associated connection normalized to the service rate, operative if the determined connection was backlogged before the packet reached the head of the associated queue, for then generating the timestamp when a new data packet arrives at the head of a queue associated with a backlogged connection as a function of the value of the previous timestamp generated for that connection incremented by the inverse of the data transfer rate allocated to the connection normalized to the service rate, and operative, following the transmission of a packet in the system, for generating a value for the system potential as a maximum value within a range extending from the latest value of the system potential incremented by a first predetermined value and a weighted sum of the timestamp values associated with all of the currently backlogged connections, in which the weight of each timestamp value in the weighted sum is the data transfer rate allocated to the associated connection, and in which the weighted sum is decremented by the number of connections that are currently backlogged, in which that result is then divided by the sum of the values of the data transfer rates allocated to all connections that are currently backlogged.

26. The apparatus of claim 25 wherein said second controller further includes apparatus, responsive to no data packets waiting in the plurality of queues, for then setting to zero the value of the system potential and the values of the timestamps associated with respective ones of the connections.

27. The apparatus of claim 25 wherein said second controller further includes apparatus, responsive to no data packets waiting in the plurality of queues, for then setting the value of the system potential equal to or larger than the largest of the timestamp values.

28. The apparatus of claim 27 wherein said second controller further includes apparatus, operative following the transmission of a packet in the system, for determining the value of the system potential as a maximum value in a range of values extending from the latest value of the system potential incremented by the first predetermined value and the value of the timestamp associated with the most recently established connection served by the system, said value of the timestamp associated with the latter connection being decremented by the number of all the connections that are currently backlogged and then divided by the sum of the values of the data transfer rates allocated to all connections that are currently backlogged.

29. The method of claim 27 wherein said second controller further includes apparatus for determining the length of each received data packet and storing the determined length in a memory location associated with the identified connection, and apparatus operative each time a data packet stored in a queue associated with a backlogged connection reaches the head of that queue and if the associated connection was not backlogged before the packet reached the head of the associated queue, for determining a timestamp as a maximum value ranging between the previous value of the timestamp assigned to the backlogged connection and the current value of the system potential, in which the maximum value is incremented by the length of the data packet divided by the data transfer rate allocated to the associated connection normalized to the service rate, operative when a data packet reaches the head of a queue associated with a backlogged connection and if that connection was backlogged before the packet reached the head of the associated queue, for generating a timestamp as the value of the previous value of the timestamp for that connection incremented by the length of the latter data packet divided by the data transfer rate allocated to the associated backlogged connection normalized to the service rate of the server, and operative following the transmission of data packet, for determining the system potential system as a maximum value in a range of values extending from the current value of the system potential incremented by the first predetermined value and the weighted sum of the timestamp values respectively associated with the currently backlogged connections, in which the weight of each timestamp value in the weighted sum is the data transfer rate allocated to the associated connection, and in which the weighted sum is decremented by the sum of the lengths of the data packets at the head of queues respectively associated with connections that are currently backlogged and then divided by the sum of the values of the data transfer rates allocated to all such connections.

30. The apparatus of claim 29 wherein said second controller further includes apparatus, responsive to when there are no data packets waiting in the plurality of queues, for resetting the value of the system potential and the value of all the timestamps to zero.

31. The apparatus of claim 29 wherein said second controller further includes apparatus, responsive to when there are no data packets waiting in the plurality of queues, for setting the value of the system potential equal to or larger than the value of the timestamp having the largest value.

32. The apparatus of claim 29 wherein said second controller further includes apparatus operative, following the transmission of a packet, for determining the value of the system potential as a maximum value in a range of values extending from the current value of the system potential incremented by the predetermined value and the value of the timestamp associated with the connection currently being served by the system, in which the latter timestamp is decremented by the sum of the lengths of the data packets that have reached the head of queues associated with connections that are currently backlogged and then divided by the sum of the values of the data transfer rates allocated to all such connections.

* * * * *